_(12)_ United States Patent
Tomizawa

(10) Patent No.: US 10,366,664 B2
(45) Date of Patent: Jul. 30, 2019

(54) DISPLAY DEVICE AND DISPLAYING METHOD OF THE SAME

(71) Applicant: Japan Display Inc., Minato-ku (JP)

(72) Inventor: Kazunari Tomizawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/664,211

(22) Filed: Jul. 31, 2017

(65) Prior Publication Data

US 2018/0033382 A1 Feb. 1, 2018

(30) Foreign Application Priority Data

Aug. 1, 2016 (JP) .................. 2016-151291

(51) Int. Cl.
*G09G 5/10* (2006.01)
*G09G 3/36* (2006.01)
(Continued)

(52) U.S. Cl.
CPC ......... *G09G 3/3607* (2013.01); *G09G 3/3413* (2013.01); *G09G 3/2003* (2013.01); *G09G 5/06* (2013.01); *G09G 5/10* (2013.01); *G09G 2300/0452* (2013.01); *G09G 2310/0251* (2013.01); *G09G 2310/0297* (2013.01); *G09G 2320/0233* (2013.01); *G09G 2320/0242* (2013.01); *G09G 2320/0285* (2013.01); *G09G 2320/0653* (2013.01); *G09G 2320/0666* (2013.01); *G09G 2320/0686* (2013.01);
(Continued)

(58) Field of Classification Search
CPC .. G09G 3/2003; G09G 3/3413; G09G 3/3607; G09G 2310/0251; G09G 2310/0297; G09G 2320/0242; G09G 2320/0653; G09G 2320/0666; G09G 2320/0686; G09G 2340/06; H04N 1/60; H04N 1/6027; H04N 1/6075; H04N 9/64; H04N 9/643
See application file for complete search history.

(56) References Cited

U.S. PATENT DOCUMENTS 5,438,649 A * 8/1995 Ruetz .................. H04N 1/6058
 358/1.9
8,373,818 B2 2/2013 Tomizawa et al.
(Continued)

FOREIGN PATENT DOCUMENTS

CN 107680049 A * 2/2018
JP 4364281 B2 11/2009
(Continued)

*Primary Examiner* — Michael J Eurice
(74) *Attorney, Agent, or Firm* — Oblon, McClelland, Maier & Neustadt, L.L.P.

(57) ABSTRACT

According to one embodiment, a display device includes a unit pixel including a first sub-pixel displaying a first color having a first hue, a second sub-pixel displaying a second color having a first hue, a third sub-pixel displaying a first color having a third hue, and a fourth sub-pixel displaying a second color having a fourth hue. The fourth hue corresponds to a point inside a triangle defined by three points corresponding to the first hue, the second hue, and the third hue. Luminance of the fourth sub-pixel is increased without increasing luminance of the third sub-pixel after luminance of the first sub-pixel reaches predetermined luminance.

14 Claims, 9 Drawing Sheets

(51) Int. Cl.
*G09G 3/34* (2006.01)
*G09G 3/20* (2006.01)
*H04N 1/60* (2006.01)
*G09G 5/06* (2006.01)
*H04N 9/64* (2006.01)

(52) U.S. Cl.
CPC ........... *G09G 2340/06* (2013.01); *H04N 1/60* (2013.01); *H04N 1/6027* (2013.01); *H04N 1/6075* (2013.01); *H04N 9/64* (2013.01); *H04N 9/643* (2013.01)

(56) References Cited

U.S. PATENT DOCUMENTS

| | | | |
|---|---|---|---|
| 8,773,340 B2 | 7/2014 | Tomizawa et al. | |
| 2004/0263528 A1* | 12/2004 | Murdoch | G09G 3/3208 345/600 |
| 2005/0083341 A1* | 4/2005 | Higgins | G09G 3/2003 345/590 |
| 2005/0083352 A1* | 4/2005 | Higgins | G09G 3/2003 345/690 |
| 2005/0206979 A1 | 9/2005 | Tomizawa et al. | |
| 2005/0225562 A1* | 10/2005 | Higgins | G09G 5/02 345/604 |
| 2005/0276502 A1* | 12/2005 | Brown Elliott | G06T 5/004 382/254 |
| 2007/0085863 A1* | 4/2007 | Moriya | G09G 3/3607 345/694 |
| 2007/0103491 A1* | 5/2007 | Moriya | G02F 1/133514 345/694 |
| 2008/0252797 A1* | 10/2008 | Hamer | G09G 3/3208 348/802 |
| 2009/0040564 A1* | 2/2009 | Granger | H04N 1/00 358/2.1 |
| 2009/0135213 A1* | 5/2009 | Tomizawa | G09G 3/2003 345/697 |
| 2009/0147328 A1* | 6/2009 | Edge | H04N 1/6075 358/520 |
| 2009/0154805 A1* | 6/2009 | Cok | G09G 3/2003 382/167 |
| 2009/0160747 A1* | 6/2009 | Morisue | G09G 3/3406 345/88 |
| 2010/0073338 A1* | 3/2010 | Miller | G09G 3/3233 345/205 |
| 2010/0084995 A1* | 4/2010 | Baaijens | H05B 33/0863 315/312 |
| 2010/0097407 A1* | 4/2010 | Zulch | G01J 3/504 345/690 |
| 2010/0315449 A1* | 12/2010 | Chaji | G09G 3/3208 345/690 |
| 2011/0128309 A1* | 6/2011 | Miyazaki | G09G 3/3607 345/690 |
| 2011/0273495 A1* | 11/2011 | Ward | G09G 3/3413 345/694 |
| 2012/0112668 A1* | 5/2012 | Van de Sluis | H05B 37/0227 315/312 |
| 2012/0162239 A1* | 6/2012 | Marcu | G09G 5/06 345/589 |
| 2012/0194565 A1* | 8/2012 | White | G09G 3/2003 345/690 |
| 2012/0207375 A1* | 8/2012 | Contreras | G06T 7/90 382/133 |
| 2013/0093783 A1* | 4/2013 | Sullivan | G09G 5/06 345/601 |
| 2013/0293519 A1* | 11/2013 | Ma | G02B 26/001 345/204 |
| 2013/0335682 A1* | 12/2013 | Gilbert | G09G 3/3426 349/85 |
| 2014/0111409 A1* | 4/2014 | Kasegawa | G09G 5/02 345/84 |
| 2014/0210878 A1* | 7/2014 | Broughton | G09G 3/003 345/694 |
| 2014/0354521 A1* | 12/2014 | Marcu | G09G 3/2003 345/82 |
| 2016/0027382 A1* | 1/2016 | Chaji | G09G 3/006 345/212 |
| 2018/0190625 A1* | 7/2018 | Steckel | G02F 1/133603 |

FOREIGN PATENT DOCUMENTS

| | | |
|---|---|---|
| JP | 4549881 B2 | 9/2010 |
| JP | 5427246 B2 | 2/2014 |

* cited by examiner

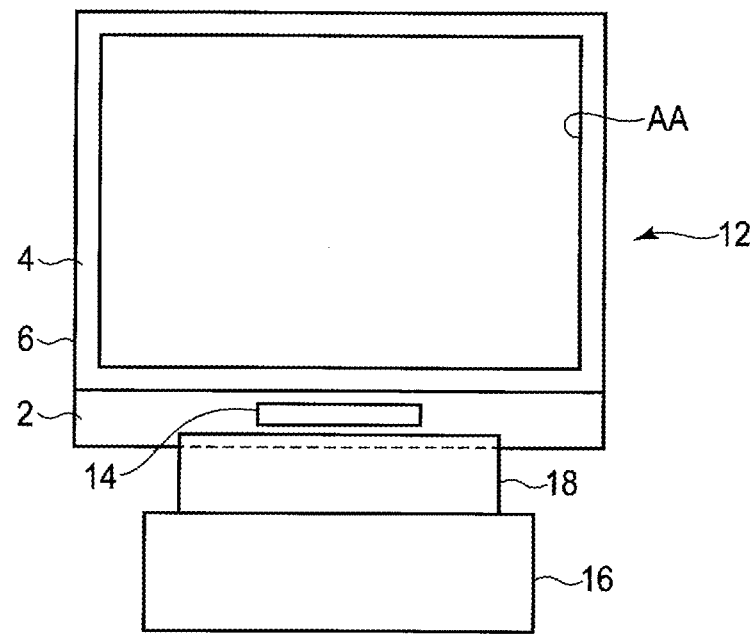
F I G. 1
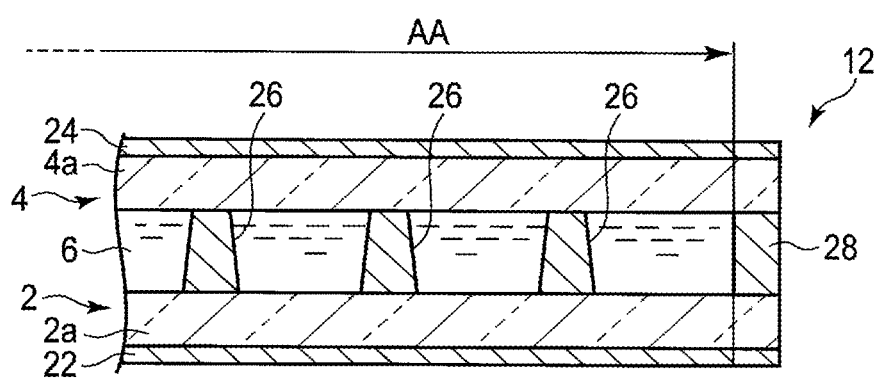
F I G. 2

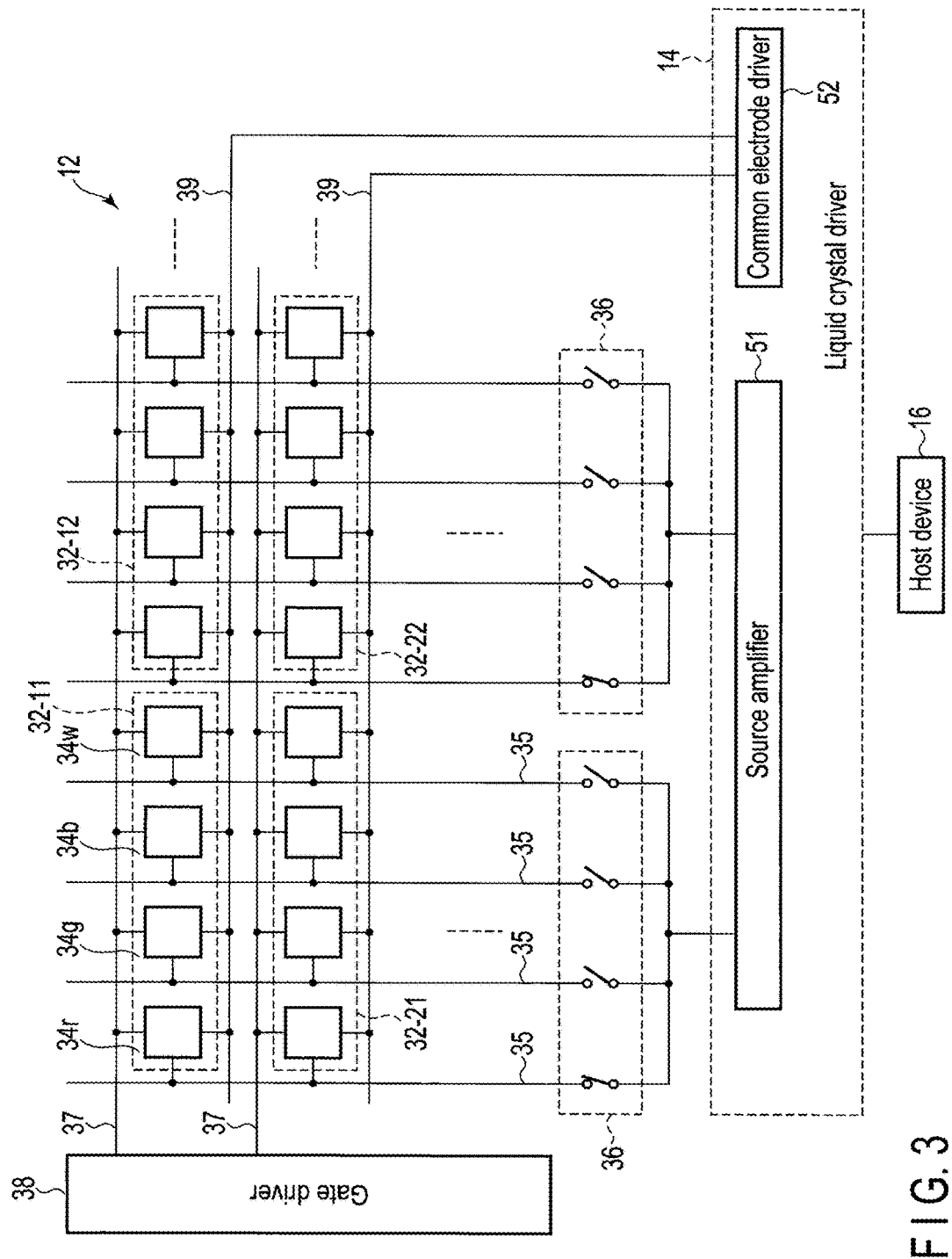
F I G. 3

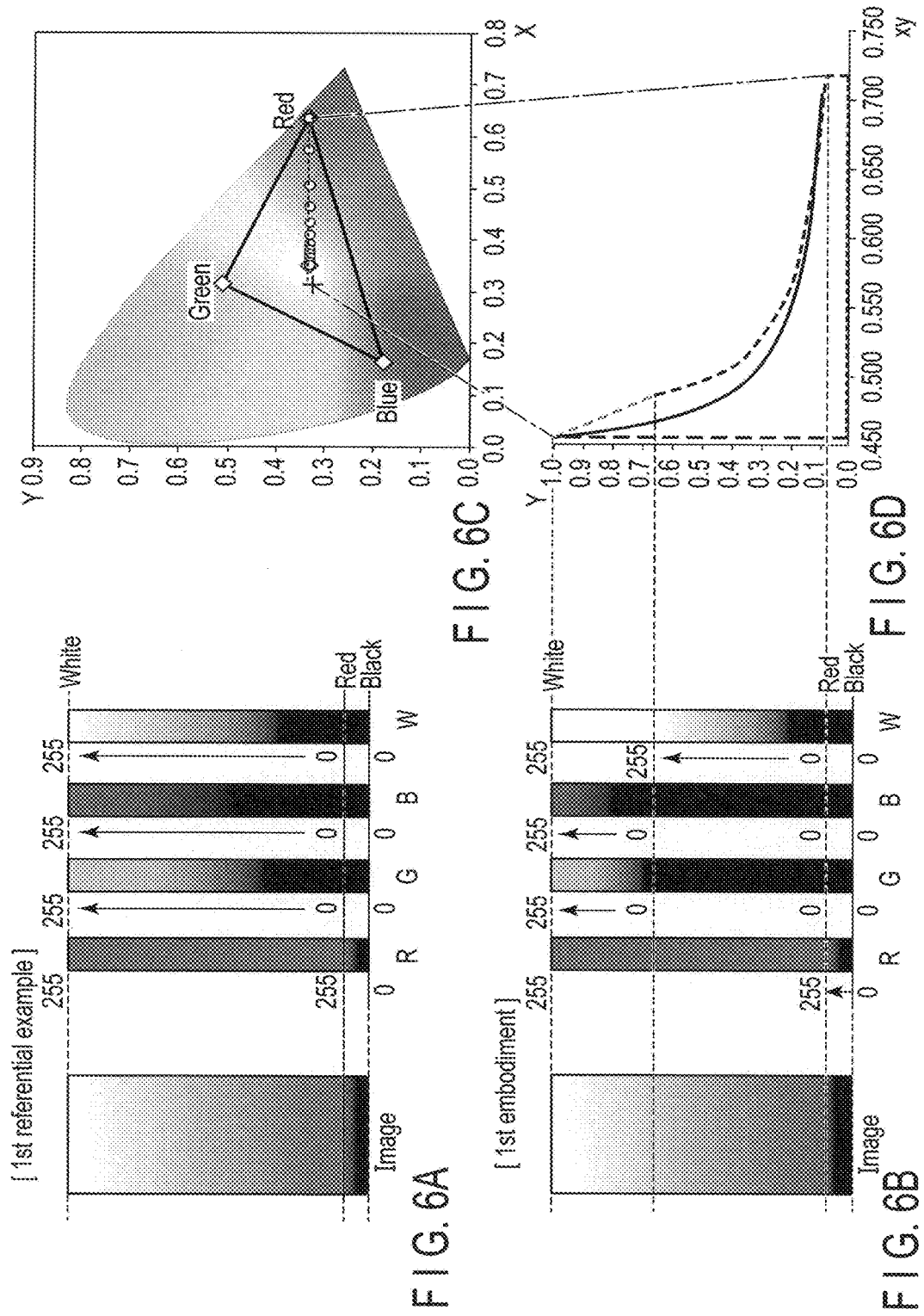

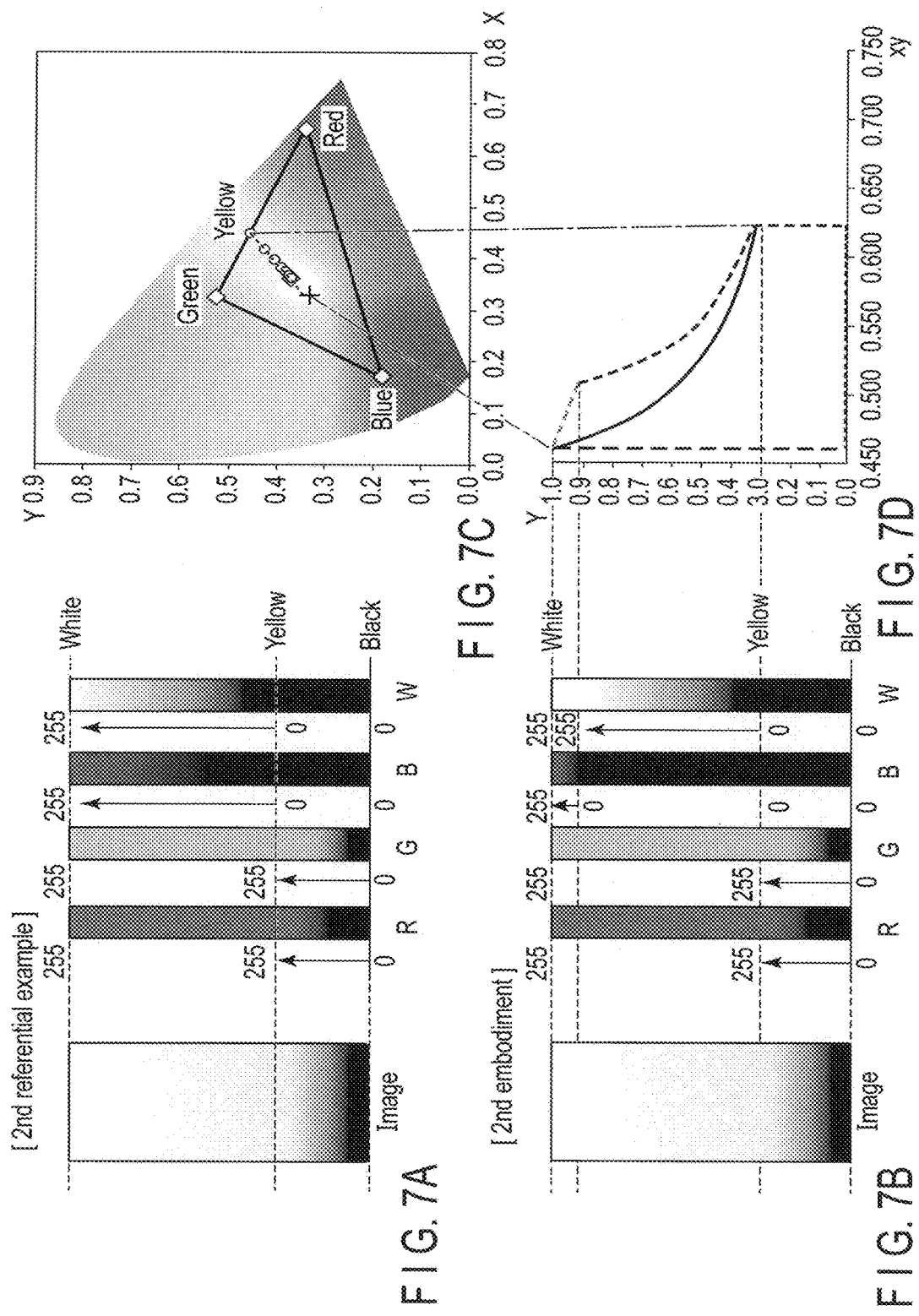

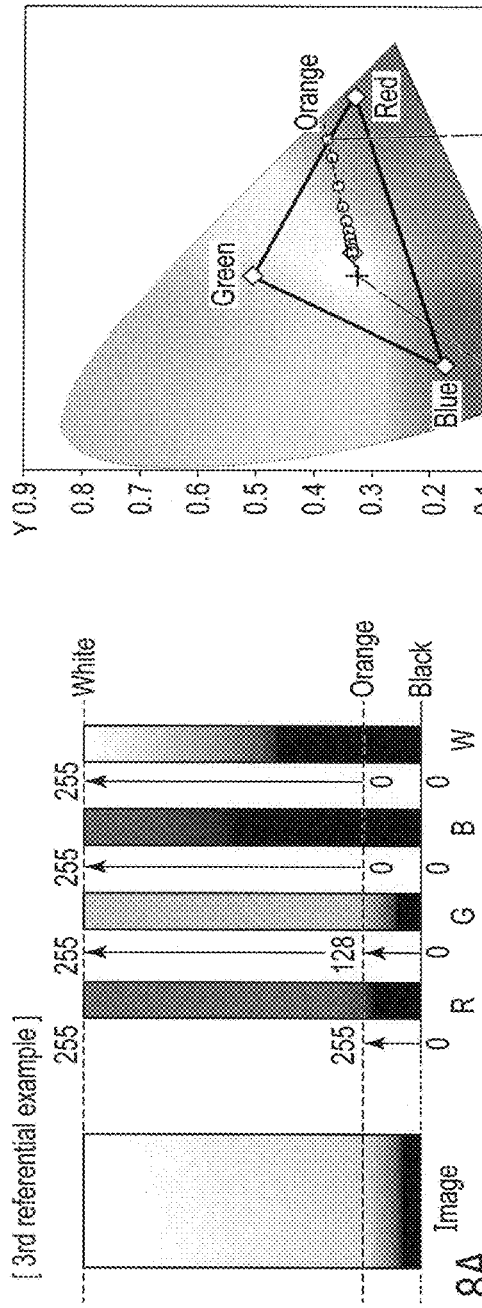
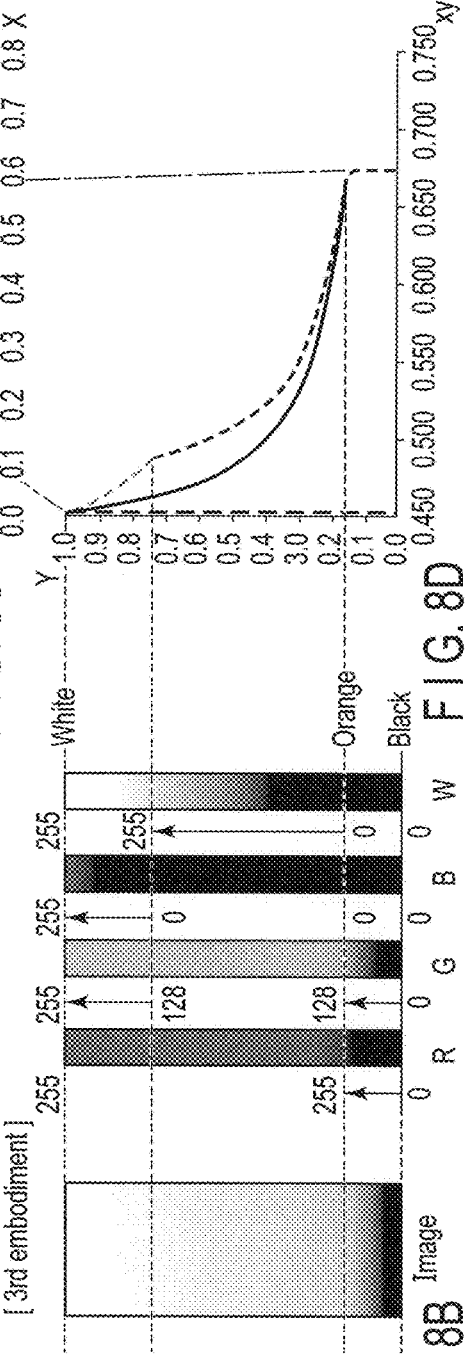
FIG. 8A
FIG. 8B
FIG. 8C
FIG. 8D

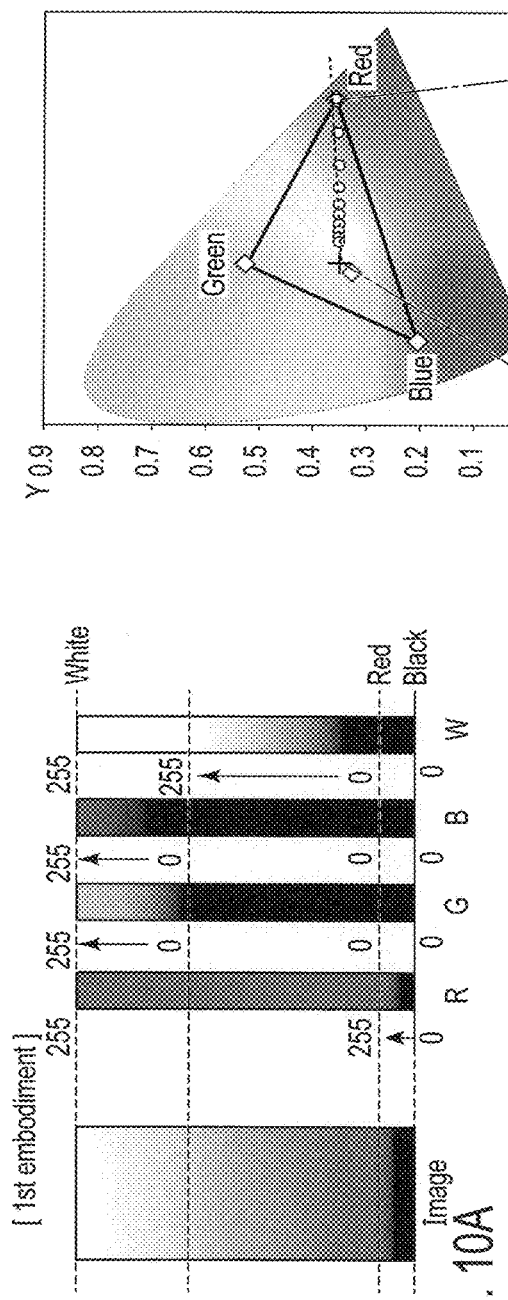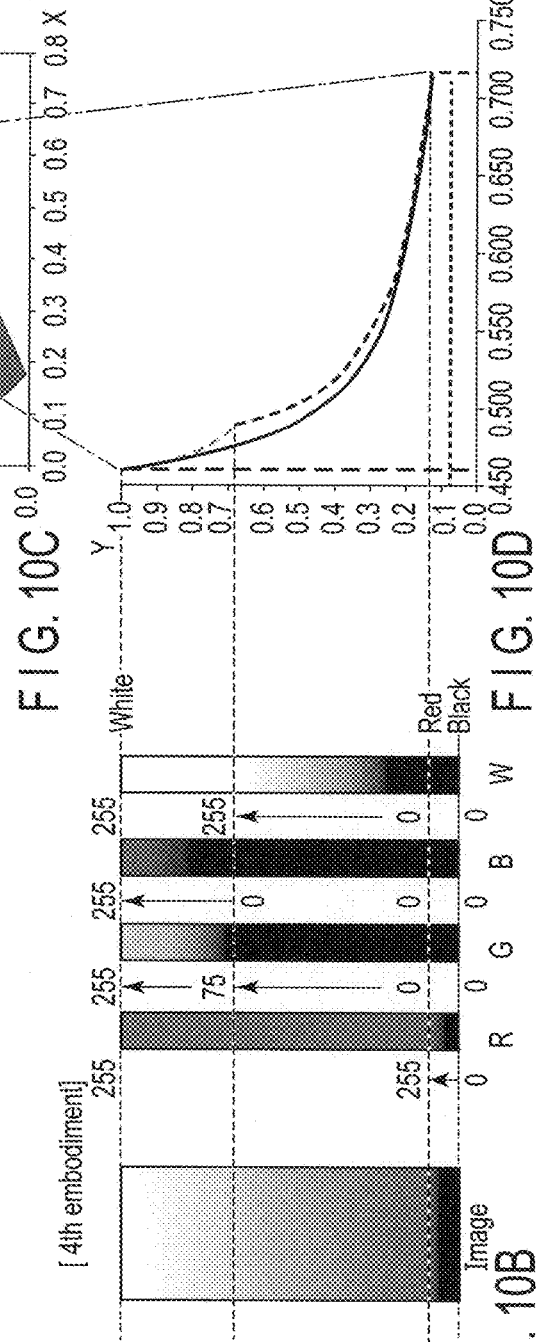
FIG. 10A
FIG. 10B
FIG. 10C
FIG. 10D

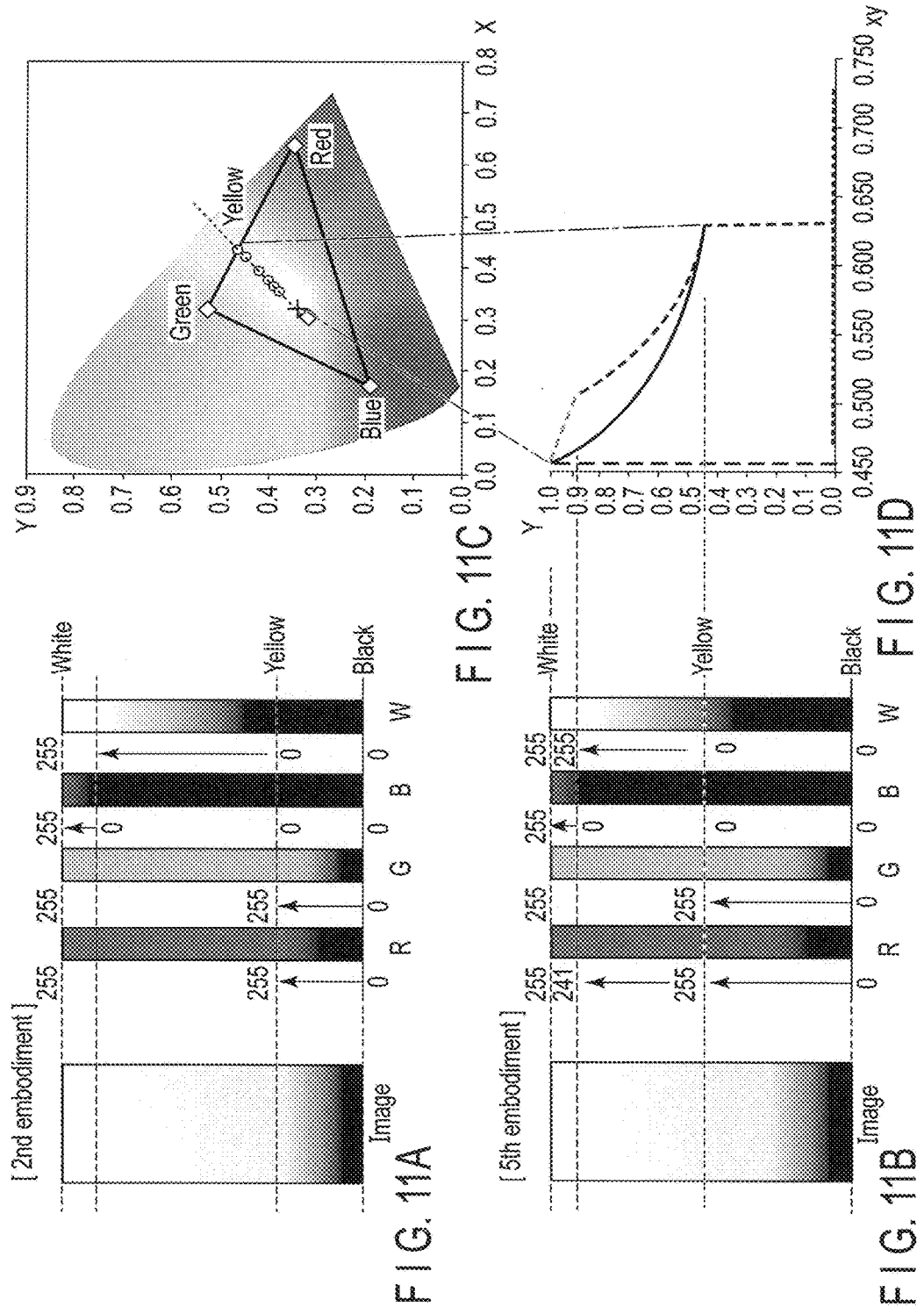

DISPLAY DEVICE AND DISPLAYING METHOD OF THE SAME

CROSS-REFERENCE TO RELATED APPLICATIONS

This application is based upon and claims the benefit of priority from Japanese Patent Application No. 2016-151291, filed Aug. 1, 2016, the entire contents of which are incorporated herein by reference.

FIELD

Embodiments described herein relate generally to a display device and a displaying method of the same capable of reproducing colors based on three or more primary colors.

BACKGROUND

A color display device such as a color TV or a color monitor generally reproduces colors by additive color mixture of three primary colors of red, green and blue. For this reason, one pixel (also called a unit pixel) of a general color display device is divided into a red sub-pixel displaying red, a green sub-pixel displaying green and a blue sub-pixel displaying blue, and the color display device can reproduce various colors by setting luminance of each of the red sub-pixel, the green sub-pixel and the blue sub-pixel at a desired value.

Luminance of each sub-pixel is controlled within a range from 0 to 255 if it is expressed at, for example, 8 bits. When luminance of all the sub-pixels forming the unit pixel, i.e., the red sub-pixel, the green sub-pixel and the blue sub-pixel are 0, the color displayed by the unit pixel is black. Oppositely, when luminance of all the sub-pixels forming the unit pixel are 255, the color displayed by the unit pixel is white.

In contrast, a display device performing additive color mixture of four or more primary colors, unlike the above-explained display device using three primary colors, has been proposed. Such a display device is also called a multi-primary color display device. In the multi-primary color display device, for example, a color such as white is used as a primary color in addition to red, green and blue and the colors can be displayed within a wide color reproduction range.

The conventional display device performing additive color mixture of four or more primary colors has a problem that since one pixel is divided into four or more sub-pixels, the efficiency of using light is poor and luminance is lower as compared with the display device performing additive color mixture of three colors.

BRIEF DESCRIPTION OF THE DRAWINGS

FIG. 1 is a schematic plan view showing an example of a configuration of a liquid crystal display device according to an embodiment.

FIG. 2 is a schematic cross-sectional view showing an example of a structure of the liquid crystal display device according to the embodiment.

FIG. 3 is a circuit diagram showing an example of a pixel array.

FIG. 6A shows an example of operations of a color conversion circuit according to the first embodiment.

FIG. 6B shows an example of operations of a color conversion circuit according to the first embodiment.

FIG. 6C shows an example of operations of a color conversion circuit according to the first embodiment.

FIG. 6D shows an example of operations of a color conversion circuit according to the first embodiment.

FIG. 7A shows an example of operations of a color conversion circuit according to the second embodiment.

FIG. 7B shows an example of operations of a color conversion circuit according to the second embodiment.

FIG. 7C shows an example of operations of a color conversion circuit according to the second embodiment.

FIG. 7D shows an example of operations of a color conversion circuit according to the second embodiment.

FIG. 8A shows an example of operations of a color conversion circuit according to the third embodiment.

FIG. 8B shows an example of operations of a color conversion circuit according to the third embodiment.

FIG. 8C shows an example of operations of a color conversion circuit according to the third embodiment.

FIG. 8D shows an example of operations of a color conversion circuit according to the third embodiment.

FIG. 10A shows an example of operations of a color conversion circuit according to the fourth embodiment.

FIG. 10B shows an example of operations of a color conversion circuit according to the fourth embodiment.

FIG. 10C shows an example of operations of a color conversion circuit according to the fourth embodiment.

FIG. 10D shows an example of operations of a color conversion circuit according to the fourth embodiment.

FIG. 11A shows an example of operations of a color conversion circuit according to the fifth embodiment.

FIG. 11B shows an example of operations of a color conversion circuit according to the fifth embodiment.

FIG. 11C shows an example of operations of a color conversion circuit according to the fifth embodiment.

FIG. 11D shows an example of operations of a color conversion circuit according to the fifth embodiment.

DETAILED DESCRIPTION

Figure 4:
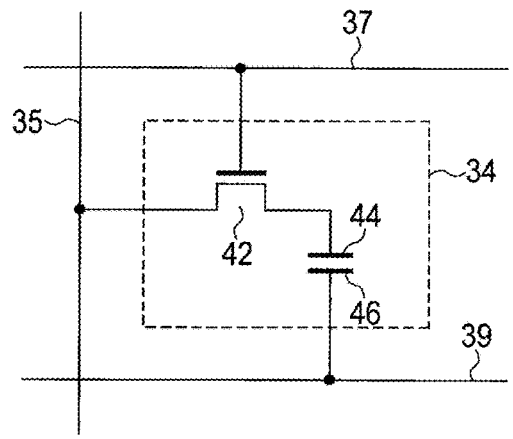
FIG. 4 is an equivalent circuit diagram showing an example of a sub-pixel forming a unit pixel in the pixel array.

Various embodiments will be described hereinafter with reference to the accompanying drawings.

In general, according to one embodiment, a display device includes a unit pixel including a plurality of sub-pixels. The plurality of sub-pixels includes: a first sub-pixel displaying a first color having a first hue; a second sub-pixel displaying a second color having a first hue; a third sub-pixel displaying a first color having a third hue; and a fourth sub-pixel displaying a second color having a fourth hue. The fourth hue corresponds to a point inside a triangle defined by a point corresponding to the first hue, a point corresponding to the second hue, and a point corresponding to the third hue, in CIE1931 chromaticity diagram. When a hue of a color displayed by the unit pixel is changed from black to white through a predetermined hue, luminance of the first sub-pixel is increased, and luminance of the fourth sub-pixel is increased without increasing luminance of the third sub-pixel after luminance of the first sub-pixel reaches predetermined luminance.

A liquid crystal display device, for example, a reflective liquid crystal display device is explained as embodiments but the embodiments may relate to a transmissive liquid crystal display device or an organic light-emitting diode display device. The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

[Overall Configuration]

FIG. 1 is a schematic plan view showing an example of a reflective liquid crystal display device according to the first embodiment. The liquid crystal display device includes a liquid crystal display panel 12, a liquid crystal driving device 14, a host device 16, a flexible printed circuit (FPC) board 18, a backlight (not shown) and the like. The liquid crystal display panel 12 may or may not include what is called a "touch detection function". The liquid crystal display panel 12 includes a transparent first substrate 2 formed of glass, resin or the like (also called an array substrate since the pixels are formed in a matrix as shown in FIG. 3), a second substrate (also called a counter substrate) 4 opposed to and spaced apart from the array substrate 2 with a predetermined gap, and a liquid crystal layer 6 held between the substrates. The liquid crystal driving device 14 may be formed of an IC or an independent circuit.

The host device 16 controls the operations of the liquid crystal display device. The FPC board 18 is a communication path which connects the host device 16 with the array substrate 2 for transmission and reception of a signal to drive the liquid crystal display panel 12. The pixels are arrayed in a matrix in a display area AA of the liquid crystal display panel 12.

[Cross-Sectional Structure]

FIG. 2 is a schematic plan view showing an example of the reflective liquid crystal display device according to the first embodiment.

The array substrate 2 includes, for example, a glass substrate 2a as a transparent insulating substrate. Scanning lines, signal lines, switching elements, and the like to be explained later, which form pixel electrodes (reflective electrodes) and pixel circuits, are formed on a surface of the glass substrate 2a opposed to the liquid crystal layer 6. A first optical layer 22 is formed on an outer surface of the array substrate 2 (i.e., a surface opposite to the liquid crystal layer 6). The first optical layer 22 is, for example, a polarizer.

The counter substrate 4 includes, for example, a glass substrate 4a as a transparent insulating substrate. A color filter, a counter-electrode (common electrode) and an alignment film are formed sequentially on the glass substrate 4a to form the counter substrate 4, which are not illustrated in the drawing. A second optical layer 24 is formed on an outer surface of the counter substrate 4 (i.e., a surface opposite to the liquid crystal layer 6). The second optical layer 24 is, for example, a polarizer. The outer surface of the second optical layer 24 is a display surface.

The gap between the array substrate 2 and the counter substrate 4 is kept by a spacer, for example, a columnar spacer 26. The array substrate 2 and the counter substrate 4 are jointed to each other by a sealing member 28 formed at peripheral portions of the substrates.

[Pixel Array]

FIG. 3 is a circuit diagram showing an example of the pixel array formed in the display area AA. A pixel array includes a number of (for example, 1080×1920) unit pixels 32-11, 32-12, . . . , 32-21, 32-22, . . . in a two-dimensional matrix at a central part of the array substrate 2. Each of the unit pixels 32 (32-11, 32-12, . . . , 32-21, 32-22, . . . ) includes sub-pixels 34r, 34g, 34b, and 34w of four colors, red, green, blue, and white, which are arranged in one-dimensional array. Color filters corresponding to red, green, blue, and white are formed on the glass substrate 4a so as to correspond to the sub-pixels 34r, 34g, 34b, and 34w. The sub-pixels 34r, 34g, 34b, and 34w forming each of the unit pixels 32 (32-11, 32-12, . . . , 32-21, 32-22, . . . ) may be arranged in one-dimensional array or two-dimensional array of 2×2. The color component of the sub-pixel 34w of the fourth color may not be white but the other color. The other color may have a hue corresponding to a point inside a triangle defined by the point corresponding to the red, the point corresponding to the green, and the point corresponding to the blue, in CIE1931 chromaticity diagram (also called an X-Y chromaticity diagram). The number of the other color is not limited to one but may be two or more.

Each of the sub-pixels 34r, 34g, 34b, and 34w includes a switching element 42 formed of a thin-film MOSFET, a pixel electrode 44, and a common electrode 46 as shown in FIG. 4. The switching element 42 has a source connected to a source line 35, a gate connected to a gate line 37, and a drain connected to the pixel electrode 44. The common electrode 46 opposed to the pixel electrode 44 is connected to a common electrode line 39.

In FIG. 3, the sources of the switching elements 42 in the sub-pixels 34r, 34g, 34b, and 34w in each column are connected to a common source line (also called a signal line) 35. Four source lines 35 connected to the sub-pixels 34r, 34g, 34b, and 34w included in one unit pixel 32 (32-11, 32-12, . . . , 32-21, 32-22, . . . ) are connected to a source amplifier 51 via an RGBW selector switch 36. The gates of the switching elements 42 in the sub-pixels 34r, 34g, 34b, and 34w in each row are connected to a common gate line (also called a scanning line) 37. One of ends of the gate line 37 is connected to a gate driver 38. The common electrodes 46 in the sub-pixels 34r, 34g, 34b, and 34w in each row are connected to the common electrode line 39. One of ends of the common electrode line 39 is connected to a common electrode driver 52. The gate lines 37 and the common electrode lines 39 are provided in proportion to the number of rows of the pixel arrays, and the gate lines 37 and the common electrode lines 39 are formed parallel to each other. The source lines 35 are formed in proportion to the number of columns of the sub-pixels 34r, 34g, 34b, and 34w and intersect the gate lines 37 and the common electrode lines 39. In other words, the sub-pixels 34r, 34g, 34b, and 34w are formed in the vicinity to intersections of the gate lines 37 and the source lines 35.

[Liquid Crystal Driving Device 14]

Figure 5:
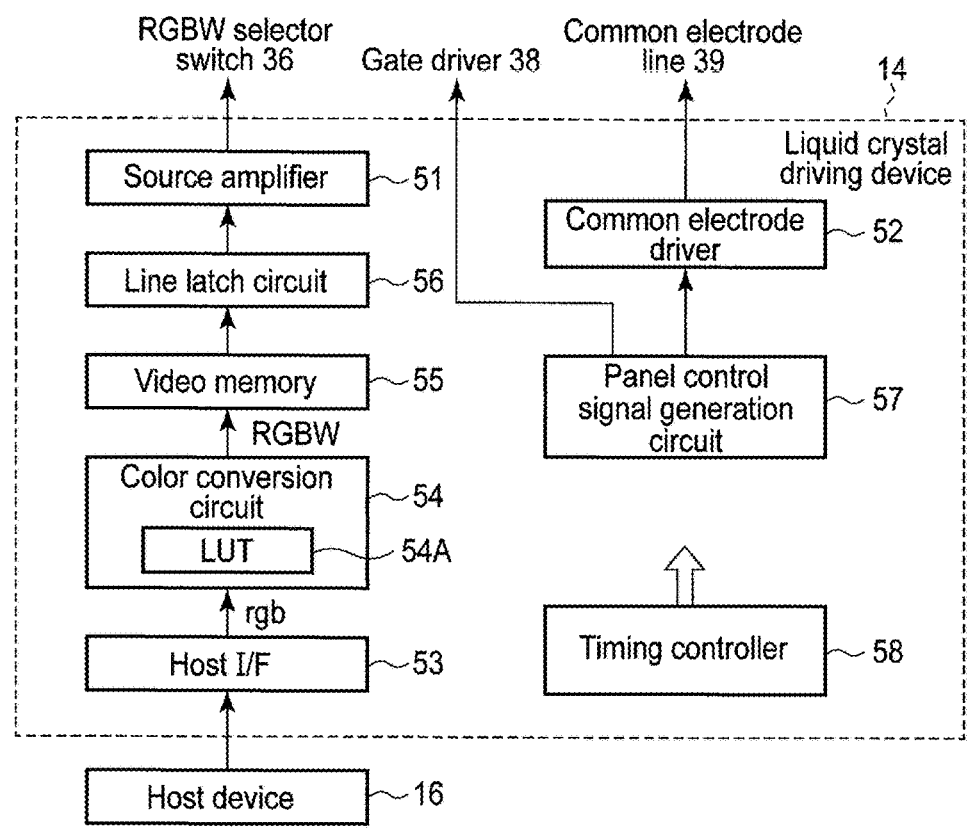
FIG. 5 is a block diagram showing an example of the liquid crystal display device according to the embodiment.

FIG. 5 is a block diagram showing an example of electric configuration of the liquid crystal driving device 14. The liquid crystal driving device 14 includes a host I/F 53 connected to the host device 16. Image signals output from the host device 16 are received by the host I/F 53, and supplied to the sub-pixels 34r, 34g, 34b, and 34w via a color conversion circuit 54, a video memory 55, a line latch circuit 56, the source amplifier 51, and the RGBW selector switch 36. The image signals supplied from the host device 16 are formed by time division multiplexing of sub-pixel signals indicative of luminance r, g, and b of three primary colors of red, green, and blue in each pixel. The host I/F 53 executes interpolation, synthesis, and the like for three primary color image signals supplied from the host device 16 such that the signals are suitable for display of the display device. The color conversion circuit 54 converts the three primary colors into, for example, image signals indicative of luminance R, G, B, and W of multiple colors, for example, four primary colors of red, green, blue, and white. The color conversion circuit 54 may include a processor which executes an operation for conversion or a look-up table (including a memory) 54A which stores R, G, B, W values obtained in advance for the respective r, g, b values. The color conversion circuit 54 supplies four primary color image signals to the video memory 55. The video memory 55 includes, for example, SRAM, DRAM or the like capable of storing one-frame image signals.

The line latch circuit 56 latches image signals in one row output from the video memory 55. The output of the line latch circuit 56 is converted into analog image signals corresponding to luminance, in the source amplifier 51. The image signals are separated into sub-pixel signals indicative of luminance R, G, B, and W of red, green, blue, and white by the RGBW selector switch 36 which operates based on the selection signal. The sub-pixel signals indicative of luminance R, G, B, and W of red, green, blue, and white are supplied to the sources of red sub-pixel 34r, green sub-pixel 34g, blue sub-pixel 34b, and white sub-pixel 34w, respectively.

As shown in FIG. 3, the switching elements 42 of the sub-pixels 34r, 34g, 34b, and 34w in one row are turned on via the gate line 37 by the gate driver 38. The gate driver 38 sequentially drives a plurality of gate lines 37. The rows turned on in the pixel array are sequentially shifted. The sub-pixel signals indicative of luminance R, G, B, and W of the sub-pixels of the respective colors output from the RGBW selector switch 36 are written to sub-pixels corresponding to the pixel electrodes 44 via the switching elements 42 of the sub-pixels 34 in the turn-on row. The operation timing of the RGBW selector switch 36 and the gate driver 38 is controlled by control signals supplied from a panel control signal generation circuit 57 in the liquid crystal driving device 14.

The common electrodes 46 of the sub-pixels 34r, 34g, 34b, and 34w are driven by the common electrode driver 52 in the liquid crystal driving device 14, and the operation timing of the common electrode driver 52 is also controlled by control signals supplied from the panel control signal generation circuit 57. Since a constant DC voltage for display is applied from the common electrode driver 52 to all the common electrodes 46 via the common electrode lines 39, during the display period, the sub-pixels 34r, 34g, 34b, and 34w to which the sub-pixel signals are written emit light according to the sub-pixel signals and display images.

The liquid crystal driving device 14 includes, for example, a timing controller 58 which determines the operation timing of each unit, based on synchronization signals, commands, and the like received from the host device 16.

[First Embodiment (Color Conversion)]

The color conversion circuit 54 converts the three primary color image signals output from the host device 16 into multi-primary color image signals corresponding to four-color sub-pixels forming the unit pixel of the pixel array. The three primary color signals indicate, for example, luminance r, g, and b of red, green, and blue, but may be signals indicative of values which can be converted into luminance r, g, and b of red, green, and blue, for example, Y, Cr, Cb signals. Luminance r, g, and b indicated by the three primary color signals and luminance R, G, B, and W indicated by the four primary color signals are generally notated in 8 bits.

Operations of the color conversion circuit 54 when the hue of the color displayed by the image signal formed of the three primary color signals is changed from "black" to "red" and then changed to "white" will be explained with reference to FIGS. 6A-6D. FIG. 6A shows a relationship between an image and luminance R, G, B, and W in the first referential example, and FIG. 6B shows a relationship between an image and luminance R, G, B, and W output from the color conversion circuit 54 in the first embodiment.

A rectangle on the left side in FIG. 6A and FIG. 6B represents the image displayed in the display area of the liquid crystal display panel 12, and the lowermost edge represents "black" and the uppermost edge represents "white" in the image (display screen). On the right side of FIG. 6A and FIG. 6B, four stripes represent luminance R, G, B, and W of the sub-pixels 34r, 34g, 34b, and 34w the lowermost edge represents the lowest luminance "0", and the uppermost edge represents the highest luminance "255".

In the first referential example shown in FIG. 6A, when the hue of the color represented by the image signals r, g, b is changed from "black" to "red", the color conversion circuit 54 first sets all luminance R, G, B and W of the red sub-pixel 34r, the green sub-pixel 34g, the blue sub-pixel 34b, and the white sub-pixel 34w at "0" (the hue of the display color is "black": all luminance r, g, and b of three primary color image signals are "0"). Then, the color conversion circuit 54 increases luminance R of the red sub-pixel 34r to the highest luminance "255" while maintaining luminance G, B, and W of the sub-pixels 34g, 34b, and 34w other than the red sub-pixel at "0". The hue of the color displayed by the image is "red" when luminance R of the sub-pixel 34r is "255" and luminance G, B, and W of the sub-pixels 34g, 34b, and 34w other than the red sub-pixel 34r are "0".

After that, the color conversion circuit 54 increases luminance G, B, and W of the sub-pixels 34g, 34b, and 34w to the highest luminance "255" at the same rate while maintaining luminance R of the red sub-pixel 34r at "255". The hue of the color displayed by the image is "white" when luminance R, G, B, and W of all the sub-pixels 34r, 34g, 34b, and 34w are "255".

In the first embodiment shown in FIG. 6B, when the hue of the color represented by the image signal is changed from "black" to "red", the color conversion circuit 54 first sets all luminance R, G, B, and W of the sub-pixels 34r, 34g, 34b, and 34w at "0". Similarly to the first referential example, the color conversion circuit 54 increases luminance R of the red sub-pixel 34r to the highest luminance "255" while maintaining luminance G, B, and W of the sub-pixels 34g, 34b, and 34w other than the red sub-pixel 34r at "0".

Then the color conversion circuit 54 increases luminance W of the white sub-pixel 34w to the highest luminance "255" while maintaining luminance R of the sub-pixel 34r at "255" and luminance G and B of the sub-pixels 34g and 34b at "0". The hue of the color displayed by the image thereby becomes "whitish red".

After that, the color conversion circuit 54 increases luminance G and B of the sub-pixels 34g and 34b to the highest luminance "255" at the same rate while maintaining luminance R and W of the sub-pixels 34r and 34w at "255". The hue of the color displayed by the image is "white" when luminance R, G, B, and W of all the sub-pixels 34r, 34g, 34b, and 34w are "255".

FIG. 6C shows a locus of a chromaticity point when the hue of the color represented by the image signal in CIE1931 chromaticity diagram (or an XY chromaticity diagram) is changed from "red" to "white". FIG. 6D shows the variation in brightness Y when the hue (xy) of the color indicated by the image signal is changed from "red" to "white". In FIG. 6D, a solid line indicates the variation in brightness Y in the first referential example, and a broken line indicates the variation in brightness Y in the first embodiment. As understood from comparison between the properties of the solid line in the first referential example and the properties of the broken line in the first embodiment, image brightness is varied while maintaining higher luminance in the first embodiment wherein luminance W is changed prior to luminance G and B than in the first referential example.

Thus, when the hue of the color represented by the image signal is changed from "red" to "white", if luminance G and B of the sub-pixels 34g and 34b are maintained at "0" and the only luminance W of the white sub-pixel 34w is increased according to the first embodiment, the brightness of the image can be improved as compared with simultaneously increasing luminance G, B, and W of the sub-pixels 34g, 34b, and 34w as in the first referential example. A center of gravity of a triangle (i.e., an area inside a triangle) formed of a point corresponding to blue, a point corresponding to red, and a point corresponding to green in CIE1931 chromaticity diagram is a point corresponding to white. When the hue of the color displayed by the image signal is changed from "red" to "white" and if luminance of three sub-pixels of green, blue, and white which are added to "red" in the first referential example are same as luminance of the white sub-pixel alone which is added to "red" in the first embodiment, whitish red can be achieved with the hue far from the white by increasing luminance in the white sub-pixel alone (red of high saturation can be achieved with the same whitish red). This is because the red color chromaticity shift based on the increase in white luminance is small as compared with an influence from the increase in blue and green luminance.

The explanations made with reference to FIGS. 6A-6D describe not the timing to start turning on the sub-pixels (increase in luminance) when the hue of the color displayed by the image signal is changed from "black" to "white" through "red", but the algorithm to set luminance of the sub-pixels corresponding to the hue of the color displayed by the image signal. In other words, the combination of luminance R, G, B, and W of the sub-pixels 34r, 34g, 34b, and 34w to achieve the hue of the color displayed by the image signal is set based on the algorithm by the color conversion circuit 54. In other words, FIGS. 6A-6D show not only the timing of turning on (starting the increase in luminance of) the sub-pixels 34r, 34g, 34b, and 34w but also the combination of luminance R, G, B, and W of the sub-pixels 34r, 34g, 34b, and 34w to achieve the hue of the color displayed by the three primary color image signals r, g, and b. For example, when the red, green, and blue luminance r, g, and b of three primary color image signals is (255, 200, 200), luminance R, G, B, and W of the sub-pixels 34r, 34g, 34b, and 34w of the liquid crystal display panel 12 is set at (255, 0, 0, 255). Luminance of each of the sub-pixels may be determined in advance based on the algorithm and stored in LUT 54A or may be calculated as needed by operation.

Table 1 shows a relationship between the input (three primary color image signals) and the output (multi-primary color image signals) of the color conversion circuit 54 in the first embodiment.

TABLE 1

Black→Increment R→Red→Increment W→
Whitish Red→Increment G and B→White

| Hue | (r, g, b) | (R, G, B, W) |
|---|---|---|
| Black | (0, 0, 0) | (0, 0, 0, 0) |
| | ... | ... |
| | (128, 0, 0) | (128, 0, 0, 0) |
| | ... | ... |
| Red | (255, 0, 0) | (255, 0, 0, 0) |
| | ... | ... |
| | (255, 100, 100) | (255, 0, 0, 128) |
| | ... | ... |
| Whitish Red | (255, 200, 200) | (255, 0, 0, 255) |
| | ... | ... |
| | (255, 223, 223) | (255, 128, 128, 235) |
| | ... | ... |
| White | (255, 255, 255) | (255, 255, 255, 255) |

The first embodiment explains the case in which the hue of the color displayed by the image signal is changed from "black" to one of three primary colors, for example, "red" and then changed to "white". Change of the hue of the color displayed by the image signal to not only "red", but the other color of three primary colors will be explained as modified examples of the first embodiment. Table 2 shows a relationship between the input (three primary color image signals) and the output (multi-primary color image signals) of the color conversion circuit 54 in a modified example in which the hue of the color displayed by the image signal is changed from "black" to "green" and then changed to "white".

TABLE 2

Black→Increment G→Green→Increment W→
Whitish Green→Increment R and B→White

| Hue | (r, g, b) | (R, G, B, W) |
|---|---|---|
| Black | (0, 0, 0) | (0, 0, 0, 0) |
| | ... | ... |
| | (0, 128, 0) | (0, 128, 0, 0) |
| | ... | ... |
| Green | (0, 255, 0) | (0, 255, 0, 0) |
| | ... | ... |
| | (100, 255, 100) | (0, 255, 0, 128) |
| | ... | ... |
| Whitish Green | (200, 255, 200) | (0, 255, 0, 255) |
| | ... | ... |
| | (223, 255, 223) | (128, 255, 128, 255) |
| | ... | ... |
| White | (255, 255, 255) | (255, 255, 255, 255) |

In the modified example shown in Table 2, when the hue of the color represented by the image signal is changed from "black" to "green", the color conversion circuit 54 first sets all luminance R, G, B, and W of the sub-pixels 34r, 34g, 34b, and 34w at "0". Then the color conversion circuit 54 increases luminance G of the green sub-pixel 34g to the highest luminance "255" while maintaining luminance R, B, and W of the sub-pixels 34r, 34b, and 34w other than the green sub-pixel 34g at "0". The hue thereby becomes "green".

After that, the color conversion circuit 54 increases luminance W of the white sub-pixel 34w to the highest luminance "255" while maintaining luminance G of the sub-pixel 34g at "255" and luminance R and B of the sub-pixels 34r and 34b at "0". The hue thereby becomes "whitish green".

After that, the color conversion circuit 54 increases luminance R and B of the sub-pixels 34r and 34b to the highest luminance "255" while maintaining luminance G and W of the sub-pixels 34g and 34w at "255". The hue of the color displayed by the image is "white" when luminance R, G, B, and W of all the sub-pixels 34r, 34g, 34b, and 34w are "255".

Table 3 shows a relationship between the input (three primary color image signals) and the output (multi-primary color image signals) of the color conversion circuit 54 in a modified example in which the hue of the color displayed by the image signal is changed from "black" to "blue" and then changed to "white".

TABLE 3

| Black→Increment B→Blue→Increment W→ Whitish Blue→Increment B and G→White | | |
|---|---|---|
| Hue | (r, g, b) | (R, G, B, W) |
| Black | (0, 0, 0) | (0, 0, 0, 0) |
| | . . . | . . . |
| | (0, 0, 128) | (0, 0, 128, 0) |
| | . . . | . . . |
| Blue | (0, 0, 255) | (0, 0, 255, 0) |
| | . . . | . . . |
| | (100, 100, 255) | (0, 0, 255, 128) |
| | . . . | . . . |
| Whitish Blue | (200, 200, 255) | (0, 0, 255, 255) |
| | . . . | . . . |
| | (223, 233, 255) | (128, 128, 255, 255) |
| | . . . | . . . |
| White | (255, 255, 255) | (255, 255, 255, 255) |

In the modified example shown in Table 3, when the hue of the color represented by the image signal is changed from "black" to "blue", the color conversion circuit 54 first sets all luminance R, G, B, and W of the sub-pixels 34r, 34g, 34b, and 34w at "0". Then the color conversion circuit 54 increases luminance B of the sub-pixel 34b to the highest luminance "255" while maintaining luminance R, G, and W of the red sub-pixels 34r, 34g, and 34w other than the blue sub-pixel 34b at "0". The hue thereby becomes "blue".

After that, the color conversion circuit 54 increases luminance W of the white sub-pixel 34w to the highest luminance "255" while maintaining luminance B of the sub-pixel 34b at "255" and luminance R and G of the sub-pixels 34r and 34g at "0". The hue thereby becomes "whitish blue".

After that, the color conversion circuit 54 increases luminance R and G of the red sub-pixels 34r and 34g to the highest luminance "255" while maintaining luminance B and W of the sub-pixels 34b and 34w at "255". The hue of the color displayed by the image is "white" when luminance R, G, B, and W of all the sub-pixels 34r, 34g, 34b, and 34w are "255".

Table 1, Table 2, and Table 3 are explained as different tables but, since the input (three primary color image signals) of the color conversion circuit 54 in the left column in three tables (other than the hue "black" and "white") is included in a single table, three tables can be integrated into one table. In other words, the combination of luminance R, G, B, and W of the sub-pixels 34r, 34g, 34b, and 34w to achieve the hue of the color displayed by the image signal is set based on the integrated table, in the first embodiment.

[Second Embodiment]

FIGS. 7A-7D show operations of the color conversion circuit 54 when the hue of a color displayed by image signals r, g, and b is changed from "black" to "yellow" (intermediate color of red and green) and then changed to "white". FIG. 7A shows a relationship between an image and luminance R, G, B, and W in the second referential example, and FIG. 7B shows a relationship between an image and luminance R, G, B, and W output from the color conversion circuit 54 in the present embodiment. A rectangle on the left side in FIG. 7A and FIG. 7B represents the image displayed in a display area of the liquid crystal display panel 12, and the lowermost edge of the image represents "black" and the uppermost edge of the image represents "white". On the right side of FIG. 7A and FIG. 7B, four stripes represent luminance R, G, B, and W of sub-pixels 34r, 34g, 34b, and 34w the lowermost edge represents the lowest luminance "0", and the uppermost edge represents the highest luminance "255".

In the second referential example shown in FIG. 7A, when the hue of the color represented by the image signals r, g, and b is changed from "black" to "yellow", the color conversion circuit 54 first sets luminance R, G, B, and W of the sub-pixels 34r, 34g, 34b, and 34w at "0" (the hue of the display color is "black": all luminance r, g, and b of three primary color image signals are "0"). Then, the color conversion circuit 54 increases luminance R and G of the sub-pixels 34r and 34g to the highest luminance "255" while maintaining luminance B and W of the sub-pixels 34b and 34w at "0". The hue of the color displayed by the image is "yellow" when luminance R and G of the sub-pixels 34r and 34g are "255" and luminance B and W of the sub-pixels 34b and 34w is "0".

After that, the color conversion circuit 54 increases luminance B and W of the sub-pixels 34b and 34w to the highest luminance "255" at the same rate while maintaining luminance R and G of the sub-pixels 34r and 34g at "255".

In the second embodiment shown in FIG. 7B, when the hue of the color represented by the image signal is changed from "black" to "yellow", the color conversion circuit 54 increases luminance R and G of the sub-pixels 34r and 34g to the highest luminance "255" at the same rate, similarly to the second referential example, while maintaining luminance B and W of the sub-pixels 34b and 34w at "0".

After that, the color conversion circuit 54 increases luminance W to the highest luminance "255" while maintaining luminance R and G of the sub-pixels 34r and 34g at "255" and luminance B of the sub-pixel 34b at "0". The hue of the color displayed by the image thereby becomes "whitish yellow".

After that, the color conversion circuit 54 increases luminance B to the highest luminance "255" while maintaining luminance R, G, and W of the sub-pixels 34r, 34b, and 34w at "255". The hue of the color displayed by the image thereby becomes "white".

FIG. 7C shows a locus of a chromaticity point when the hue of the color represented by the image signal in CIE1931 chromaticity diagram (or an XY chromaticity diagram) is changed from "yellow" to "white". FIG. 7D shows the variation in brightness Y when the hue (xy) of the color displayed by the image signal is changed from "yellow" to "white". In FIG. 7D, a solid line indicates the variation in brightness Y in the second referential example, and a broken line indicates the variation in brightness Y in the second embodiment. As understood from comparison between the properties of the solid line in the second referential example and the properties of the broken line in the second embodiment, image brightness is varied while maintaining higher luminance in the second embodiment wherein luminance W is changed prior to luminance B than in the second referential example.

Thus, when the hue of the color represented by the image signal is changed from "yellow" to "white", if luminance B of the sub-pixel 34b is maintained at "0" and the only luminance W of the sub-pixel 34w is increased according to the second embodiment, the brightness of the image can be improved as compared with simultaneously increasing luminance B and W of the sub-pixels 34b and 34w as in the second referential example. When the hue of the color displayed by the image signal is changed from "yellow" to "white" and if luminance of two sub-pixels of blue and white which are added to "yellow" in the second referential example are the same as luminance of the white sub-pixel alone which is added to "yellow" in the second embodiment, whitish red can be achieved with the hue far from the white color by increasing luminance in the white sub-pixel alone (yellow of high saturation can be achieved with the same whitish yellow). This is because the yellow color chromaticity shift based on the increase in white luminance is small as compared with an influence from the increase in blue luminance.

Table 4 shows a relationship between the input (three primary color image signals) and the output (multi-primary color image signals) of the color conversion circuit 54 in the second embodiment.

TABLE 4

| Black→Increment R and G→Yellow→Increment W→ Whitish Yellow→Increment B→White | | |
|---|---|---|
| Hue | (r, g, b) | (R, G, B, W) |
| Black | (0, 0, 0) | (0, 0, 0, 0) |
|  | . . . | . . . |
|  | (128, 128, 0) | (128, 128, 0, 0) |
|  | . . . | . . . |
| Yellow | (255, 255, 0) | (255, 255, 0, 0) |
|  | . . . | . . . |
|  | (255, 255, 100) | (255, 255, 0, 128) |
|  | . . . | . . . |
| Whitish Yellow | (255, 255, 200) | (255, 255, 0, 255) |
|  | . . . | . . . |
|  | (255, 255, 223) | (255, 255, 128, 255) |
|  | . . . | . . . |
| White | (255, 255, 255) | (255, 255, 255, 255) |

The second embodiment explains the case in which the hue of the color displayed by the image signal is changed from "black" to "yellow", which is an intermediate color of two of three primary colors, red and green, and then changed to "white". Change of the hue of the color displayed by the image signal to not only "yellow", but the intermediate color of two others of three primary colors will be explained as a modified example of the second embodiment. Table 5 shows a relationship between the input (three primary color image signals) and the output (multi-primary color image signals) of the color conversion circuit 54 in a modified example in which the hue of the color displayed by the image signal is changed from "black" to "cyan (intermediate color of green and blue)" and then changed to "white".

TABLE 5

| Black→Increment G and B→Cyan→Increment W→ Whitish Cyan→Increment R→White | | |
|---|---|---|
| Hue | (r, g, b) | (R, G, B, W) |
| Black | (0, 0, 0) | (0, 0, 0, 0) |
|  | . . . | . . . |
|  | (0, 128, 128) | (0, 128, 128, 0) |
|  | . . . | . . . |
| Cyan | (0, 255, 255) | (0, 255, 255, 0) |
|  | . . . | . . . |

TABLE 5-continued

| Black→Increment G and B→Cyan→Increment W→ Whitish Cyan→Increment R→White | | |
|---|---|---|
| Hue | (r, g, b) | (R, G, B, W) |
|  | (100, 255, 255) | (0, 255, 255, 128) |
|  | . . . | . . . |
| Whitish Cyan | (200, 255, 255) | (0, 255, 255, 255) |
|  | . . . | . . . |
|  | (223, 255, 255) | (128, 255, 255, 255) |
|  | . . . | . . . |
| White | (255, 255, 255) | (255, 255, 255, 255) |

In the modified example shown in Table 5, when the hue of the color represented by the image signal is changed from "black" to "cyan", the color conversion circuit 54 first sets all luminance R, G, B, and W of the sub-pixels 34r, 34g, 34b, and 34w at "0". Then the color conversion circuit 54 increases luminance G and B of the sub-pixels 34g and 34B to the highest luminance "255" at the same rate while maintaining luminance R and W of the sub-pixels 34r and 34w at "0".

After that, the color conversion circuit 54 increases luminance W of the sub-pixel 34w to the highest luminance "255" while maintaining luminance R of the sub-pixel 34r at "0" and luminance G and B of the sub-pixels 34g and 34b at "255". The hue thereby becomes "whitish cyan".

After that, the color conversion circuit 54 increases luminance R of the sub-pixel 34r to the highest luminance "255" while maintaining luminance G, B, and W of the sub-pixels 34g, 34b, and 34w at "255". The hue thereby becomes "white".

Table 6 shows a relationship between the input (three primary color image signals) and the output (multi-primary color image signals) of the color conversion circuit 54 in a modified example in which the hue of the color displayed by the image signal is changed from "black" to "magenta (intermediate color of blue and red)" and then changed to "white".

TABLE 6

| Black→Increment R and G→Magenta→Increment W→ Whitish Magenta→Increment B→White | | |
|---|---|---|
| Hue | (r, g, b) | (R, G, B, W) |
| Black | (0, 0, 0) | (0, 0, 0, 0) |
|  | . . . | . . . |
|  | (128, 0, 128) | (128, 0, 128, 0) |
|  | . . . | . . . |
| Magenta | (255, 0, 255) | (255, 0, 255, 0) |
|  | . . . | . . . |
|  | (255, 100, 255) | (255, 0, 255, 128) |
|  | . . . | . . . |
| Whitish Magenta | (255, 200, 255) | (255, 0, 255, 255) |
|  | . . . | . . . |
|  | (255, 223, 255) | (255, 128, 255, 255) |
|  | . . . | . . . |
| White | (255, 255, 255) | (255, 255, 255, 255) |

In the modified example shown in Table 6, when the hue of the color represented by the image signal is changed from "black" to "magenta", the color conversion circuit 54 first sets all luminance R, G, B, and W of the sub-pixels 34r, 34g, 34b, and 34w at "0". Then the color conversion circuit 54 increases luminance R and B of the sub-pixels 34r and 34B to the highest luminance "255" at the same rate while maintaining luminance G and W of the sub-pixels 34g and 34w at "0".

After that, the color conversion circuit 54 increases luminance W of the sub-pixel 34w to the highest luminance "255" while maintaining luminance R and B of the sub-pixels 34r and 34b at "255" and luminance G of the sub-pixel 34g at "0". The hue thereby becomes "whitish magenta".

After that, the color conversion circuit 54 increases luminance G of the sub-pixel 34g to the highest luminance "255" while maintaining luminance R, B, and W of the sub-pixels 34r, 34b, and 34w at "255". The hue thereby becomes "white".

Table 4, Table 5, and Table 6 are explained as different tables but, since the input (three primary color image signals) of the color conversion circuit 54 in the left column in three tables (other than the hue "black" and "white") is included in the only single table, three tables can be integrated into one table. In other words, the combination of luminance R, G, B, and W of the sub-pixels 34r, 34g, 34b, and 34w to achieve the hue of the color displayed by the image signal is set based on the integrated table, in the second embodiment. Furthermore, since the input (three primary color image signals) of the color conversion circuit 54 in the left column, other than the hue "black" and "white", is included in the only single table in Table 1 to Table 6 too, six tables can be integrated into one table. In other words, the combination of luminance R, G, B, and W of the sub-pixels 34r, 34g, 34b, and 34w to achieve the hue of the color displayed by the image signal is set based on the integrated table, in the first embodiment and the second embodiment.

[Third Embodiment]

FIGS. 8A-8D show operations of the color conversion circuit 54 when the hue of a color displayed by image signals is changed from "black" to "orange" (intermediate color of red and yellow) and then changed to "white". FIG. 8A shows a relationship between an image and luminance R, G, B, and W in the third referential example, and FIG. 8B shows a relationship between an image and luminance R, G, B, and W output from the color conversion circuit 54 in the present embodiment. A rectangle on the left side in FIG. 8A and FIG. 8B represents the image displayed in a display area of the liquid crystal display panel 12, and the lowermost edge of the image represents "black" and the uppermost edge of the image represents "white". On the right side of FIG. 8A and FIG. 8B, four stripes represent luminance R, G, B, and W of sub-pixels 34r, 34g, 34b, and 34w the lowermost edge represents the lowest luminance "0", and the uppermost edge represents the highest luminance "255".

In the third referential example shown in FIG. 8A, when the hue of the color represented by the image signals r, g, and b is changed from "black" to "orange", the color conversion circuit 54 first sets luminance R, G, B, and W of the sub-pixels 34r, 34g, 34b, and 34w at "0" (the hue of the display color is "black": all luminance r, g, and b of three primary color image signals are "0"). Then, the color conversion circuit 54 increases luminance R of the sub-pixel 34r to the highest luminance "255" and luminance G of the sub-pixel 34g to half the highest luminance "128" while maintaining luminance B and W of the sub-pixels 34b and 34w at "0". The increase rate of luminance G of the sub-pixel 34g is half the increase rate of luminance R of the sub-pixel 34r. The hue of the color displayed by the image is "orange" when luminance R of the sub-pixel 34r is "255", luminance G of the sub-pixel 34g is "128", and luminance B and W of the sub-pixels 34b and 34w are "0".

After that, the color conversion circuit 54 increases luminance G of the sub-pixel 34g from "128" to the highest luminance "255" and luminance B and W of the sub-pixels 34b and 34w from "0" to the highest luminance "255" while maintaining luminance R of the sub-pixel 34r at "255". The increase rate of luminance G of the sub-pixel 34g is half the increase rate of luminance B and W of the sub-pixels 34b and 34w.

In the third embodiment shown in FIG. 8B, when the hue of the color represented by the image signal is changed from "black" to "orange", the color conversion circuit 54 increases luminance R of the sub-pixel 34r to the highest luminance "255" and luminance G of the sub-pixel 34g to half the highest luminance "255" similarly to the third referential example, while maintaining luminance B and W of the sub-pixels 34b and 34w at "0". The increase rate of luminance G of the sub-pixel 34g is half the increase rate of luminance R of the sub-pixel 34r.

After that, the color conversion circuit 54 increases luminance W of the sub-pixel 34w to the highest luminance "255" while maintaining luminance R of the sub-pixel 34r at "255", luminance G of the sub-pixel 34g at "128", and luminance B of the sub-pixel 34b at "0". The hue of the color displayed by the image thereby becomes "whitish orange".

After that, the color conversion circuit 54 increases luminance G of the sub-pixel 34g from "128" to the highest luminance "255" and luminance B of the sub-pixel 34b from "0" to the highest luminance "255" while maintaining luminance R and W of the sub-pixels 34r and 34w at "255". The increase rate of luminance G of the sub-pixel 34g is half the increase rate of luminance B of the sub-pixel 34b. The hue of the color displayed by the image thereby becomes "white".

FIG. 8C shows a locus of a chromaticity point when the hue of the color represented by the image signal in CIE1931 chromaticity diagram (or an XY chromaticity diagram) is changed from "orange" to "white". FIG. 8D shows the variation in brightness Y when the hue (xy) of the color indicated by the image signals is changed from "orange" to "white". In FIG. 8D, a solid line indicates the variation in brightness Y in the third referential example, and a broken line indicates the variation in brightness Y in the third embodiment. As understood from comparison between the properties of the solid line in the third referential example and the properties of the broken line in the third embodiment, image brightness is varied while maintaining higher luminance in the third embodiment wherein luminance W is changed prior to luminance B than in the third referential example.

Thus, when the hue of the color represented by the image signal is changed from "orange" to "white", if luminance B of the sub-pixel 34b is maintained at "0" and the only luminance W of the sub-pixel 34w is increased according to the third embodiment, the brightness of the image can be improved as compared with simultaneously increasing luminance G, B, and W of the sub-pixels 34g, 34b, and 34w as in the third referential example. When the hue of the color displayed by the image signal is changed from "orange" to "white" and if luminance of two sub-pixels of blue and white which are added to "orange" in the third referential example are the same as luminance of the white sub-pixel alone which is added to "orange" in the third embodiment, whitish orange can be achieved with the hue far from the white color by increasing luminance in the white sub-pixel alone (red of high saturation can be achieved with the same whitish orange). This is because the orange color chromaticity shift based on the increase in white luminance is small as compared with an influence from the increase in blue luminance.

Table 7 shows a relationship between the input (three primary color image signals) and the output (multi-primary color image signals) of the color conversion circuit 54 in the third embodiment.

TABLE 7

Black→Increment R and G→Orange→Increment W→
Whitish Orange→Increment G and B→White

| Hue | (r, g, b) | (R, G, B, W) |
|---|---|---|
| Black | (0, 0, 0) | (0, 0, 0, 0) |
| | . . . | . . . |
| | (128, 64, 0) | (128, 64, 0, 0) |
| | . . . | . . . |
| Orange | (255, 128, 0) | (255, 128, 0, 0) |
| | . . . | . . . |
| | (255, 128, 100) | (255, 128, 0, 128) |
| | . . . | . . . |
| Whitish Orange | (255, 240, 200) | (255, 128, 0, 255) |
| | . . . | . . . |
| | (255, 248, 223) | (255, 191, 128, 255) |
| | . . . | . . . |
| White | (255, 255, 255) | (255, 255, 255, 255) |

"Yellow" is an intermediate color of "red" and "green" of three primary colors. The third embodiment explains the case in which the hue of the color displayed by the image signal is changed from "black" to "white" through an intermediate color (orange) of one (red) of three primary colors and the intermediate color (yellow) of two (red and green) of thee primary colors. The third embodiment includes five modified examples using "yellow green", "blue green", "greenish blue", "blue violet" and "red violet" instead of "orange". "Yellow green" is an intermediate color of "green" and "yellow" (intermediate color of red and green). "Blue green" is an intermediate color of "green" and "cyan" (intermediate color of blue and green). "Greenish blue" is an intermediate color of "blue" and "cyan" (intermediate color of blue and green)". "Blue violet" is an intermediate color of "blue" and "magenta" (intermediate color of blue and red). "Red violet" is an intermediate color of "red" and "magenta" (intermediate color of blue and red). A relationship between the input (three primary color image signals) and the output (multi-primary color image signals) of the color conversion circuit 54 in a case in which the hue of the color displayed by the image signal is changed from "black" to "white" through "yellow green" is shown in Table 8 as one of modified examples.

TABLE 8

Black→Increment R and G→Yellow Green→Increment W→
Whitish Yellow Green→Increment R and B→White

| Hue | (r, g, b) | (R, G, B, W) |
|---|---|---|
| Black | (0, 0, 0) | (0, 0, 0, 0) |
| | . . . | . . . |
| | (64, 128, 0) | (64, 128, 0, 0) |
| | . . . | . . . |

TABLE 8-continued

Black→Increment R and G→Yellow Green→Increment W→
Whitish Yellow Green→Increment R and B→White

| Hue | (r, g, b) | (R, G, B, W) |
|---|---|---|
| Yellow Green | (128, 255, 0) | (128, 255, 0, 0) |
| | . . . | . . . |
| | (128, 255, 100) | (128, 255, 0, 128) |
| | . . . | . . . |
| Whitish Yellow Green | (240, 255, 200) | (128, 255, 0, 255) |
| | . . . | . . . |
| | (248, 255, 223) | (191, 255, 128, 255) |
| | . . . | . . . |
| White | (255, 255, 255) | (255, 255, 255, 255) |

In the modified example shown in Table 8, when the hue of the color represented by the image signal is conversion circuit 54 first sets all luminance R, G, B, and W of the sub-pixels 34*r*, 34*g*, 34*b*, and 34*w* at "0". Then the color conversion circuit 54 increases luminance R of the sub-pixel 34*r* to half the highest luminance "128" and luminance G of the sub-pixel 34*g* to the highest luminance "255" while maintaining luminance B and W of the sub-pixels 34*b* and 34*w* at "0". The increase rate of luminance R of the sub-pixel 34*r* is half the increase rate of luminance G of the sub-pixel 34*g*.

After that, the color conversion circuit 54 increases luminance W of the sub-pixel 34*w* to the highest luminance "255" while maintaining luminance R of the sub-pixel 34*r* at "128", luminance G of the sub-pixel 34*g* at "255", and luminance B of the sub-pixel 34*b* at "0". The hue thereby becomes "whitish yellow green".

After that, the color conversion circuit 54 increases luminance R of the sub-pixel 34*r* from "128" to the highest luminance "255" and luminance B of the sub-pixel 34*b* from "0" to the highest luminance "255" while maintaining luminance G and W of the sub-pixels 34*b* and 34*w* at "255". The increase rate of luminance R of the sub-pixel 34*r* is half the increase rate of luminance B of the sub-pixel 34*b*. The hue thereby becomes "white".

Table 9 shows a relationship between the input (three primary color image signals) and the output (multi-primary color image signals) of the color conversion circuit 54 in a modified example in which the hue of the color displayed by the image signal is changed from "black" to "blue green" and then changed to "white", as one of the modified examples of the third embodiment.

TABLE 9

Black→Increment R and G→Blue Green→Increment W→
Whitish Blue Green→Increment R and B→White

| Hue | (r, g, b) | (R, G, B, W) |
|---|---|---|
| Black | (0, 0, 0) | (0, 0, 0, 0) |
| | . . . | . . . |
| | (0, 128, 64) | (0, 128, 64, 0) |
| | . . . | . . . |
| Blue Green | (0, 255, 128) | (0, 255, 128, 0) |
| | . . . | . . . |
| | (100, 255, 128) | (0, 255, 128, 128) |
| | . . . | . . . |

TABLE 9-continued

Black→Increment R and G→Blue Green→Increment W→
Whitish Blue Green→Increment R and B→White

| Hue | (r, g, b) | (R, G, B, W) |
|---|---|---|
| Whitish Blue Green | (200, 255, 240) | (0, 255, 128, 255) |
| | ... | ... |
| | (223, 255, 248) | (128, 255, 191, 255) |
| | ... | ... |
| White | (255, 255, 255) | (255, 255, 255, 255) |

In the modified example shown in Table 9, when the hue of the color represented by the image signal is changed from "black" to "blue green", the color conversion circuit 54 first sets all luminance R, G, B, and W of the sub-pixels 34r, 34g, 34b, and 34w at "0". Then the color conversion circuit 54 increases luminance G of the sub-pixel 34g to the highest luminance "255" and luminance B of the sub-pixel 34b to half the highest luminance "128" while maintaining luminance R and W of the sub-pixels 34r and 34 W at "0". The increase rate of luminance B of the sub-pixel 34b is half the increase rate of luminance G of the sub-pixel 34g.

After that, the color conversion circuit 54 increases luminance W of the sub-pixel 34w to the highest luminance "255" while maintaining luminance R of the sub-pixel 34r at "0", luminance G of the sub-pixel 34g at "255", and luminance B of the sub-pixel 34b at "128". The hue thereby becomes "whitish blue green".

After that, the color conversion circuit 54 increases luminance R of the sub-pixel 34r from "0" to the highest luminance "255" and luminance B of the sub-pixel 34b from "128" to the highest luminance "255" while maintaining luminance G and W of the sub-pixels 34g and 34w at "255". The increase rate of luminance R of the sub-pixel 34d is half the increase rate of luminance B of the sub-pixel 34b. The hue thereby becomes "blue green".

The modified examples using "yellow green" and "blue green" instead of "orange" are shown in the tables, but modified examples using "greenish blue", "blue violet" and "red violet" instead of "orange" can also be achieved.

Table 7, Table 8, and Table 9 are explained as different tables but, since the input (three primary color image signals) of the color conversion circuit 54 in the left column in three tables (other than the hue "black" and "white") is included in the only single table, three tables can be integrated into one table. In other words, the combination of luminance R, G, B, and W of the sub-pixels 34r, 34g, 34b, and 34w to achieve the hue of the color displayed by the image signal is set based on the integrated table, in the third embodiment. Furthermore, since the input (three primary color image signals) of the color conversion circuit 54 in the left column, other than the hue "black" and "white", is included in the only single table in Table 1 to Table 9 too, nine tables can be integrated into one table. In other words, the combination of luminance R, G, B, and W of the sub-pixels 34r, 34g, 34b, and 34w to achieve the hue of the color displayed by the image signal is set based on the integrated table, in the first embodiment, the second embodiment, and the third embodiment.

Figure 9:
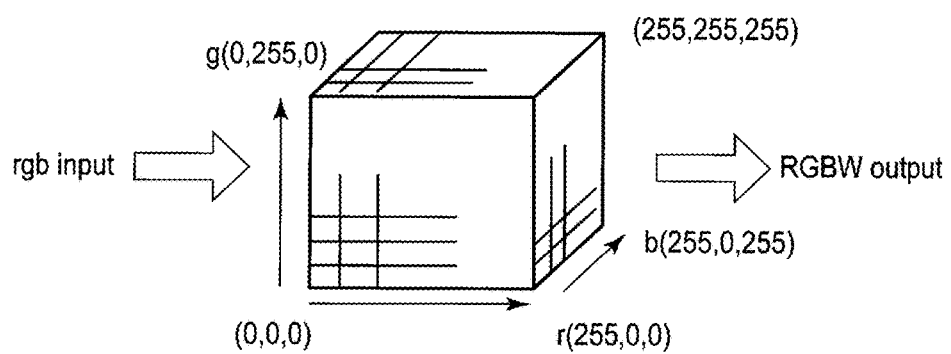
FIG. 9 illustrates an example of a look-up table of the color conversion circuit according to the embodiments.

The LUT 54A of the color conversion circuit 54 is a three dimensional LUT as shown in FIG. 9, which generates RGBW output in response to the rgb input as expressed in a table formed by combining Table 1 to Table 9. The LUT 54A is a memory having a three dimensional address indicated by the rgb input. The RGBW output corresponding to the rgb input is calculated in advance and stored in the LUT 54A. The three dimensions of the address correspond to the rgb input, for example, X axis direction corresponds to luminance r, Y axis direction corresponds to luminance b, and Z axis direction corresponds to luminance g.

[Fourth Embodiment]

The above embodiments are based on the feature that chromaticity point (x, y) at which luminance of the white sub-pixel 34w is "255" matches RGBW (total) chromaticity point (x, y) at which all luminance R, G, B, and W of the sub-pixels 34r, 34g, 34b, and 34w are "255", as shown in Table 10.

TABLE 10

| | X | Y | Z | x | y |
|---|---|---|---|---|---|
| R | 0.169 | 0.089 | 0.009 | 0.633 | 0.333 |
| G | 0.141 | 0.231 | 0.080 | 0.313 | 0.510 |
| B | 0.093 | 0.101 | 0.371 | 0.165 | 0.179 |
| W | 0.555 | 0.579 | 0.633 | 0.314 | 0.328 |
| RGBW (Total) | 0.960 | 1.00 | 1.093 | 0.314 | 0.328 |

In fact, however, the chromaticity point (x, y) at which luminance of the white sub-pixel 34w is "255" often does not match the RGBW (total) chromaticity point (x, y) at which all luminance R, G, B, and W of the sub-pixels 34r, 34g, 34b, and 34w are "255". For example, as shown in Table 11, the chromaticity point (x, y: 0.298, 0.305) at which luminance W of the white sub-pixel 34w is "255" often shifted to blue with respect to the RGBW (total) chromaticity point (x, y:0.314, 0.328) at which all luminance R, G, B, and W of the sub-pixels 34r, 34g, 34b, and 34w are "255", due to deviation of the properties of the color filter.

TABLE 11

| | X | Y | Z | x | y |
|---|---|---|---|---|---|
| R | 0.224 | 0.118 | 0.012 | 0.633 | 0.333 |
| G | 0.201 | 0.327 | 0.114 | 0.313 | 0.510 |
| B | 0.093 | 0.101 | 0.371 | 0.165 | 0.179 |
| W | 0.442 | 0.454 | 0.596 | 0.298 | 0.305 |
| RGBW (Total) | 0.960 | 1.00 | 1.093 | 0.314 | 0.328 |

The fourth embodiment capable of responding to such a case will be explained below. FIGS. 10A-10D show operations of the color conversion circuit 54 when the hue of the color displayed by the image signal is changed from "black" to "red" and then changed to "white", similarly to the first embodiment. FIG. 10A shows a relationship between an image and luminance R, G, B, and W in the first embodiment, and FIG. 10B shows a relationship between an image and luminance R, G, B, and W output from the color conversion circuit 54 in the fourth embodiment.

In the fourth embodiment shown in FIG. 10B, when the hue of the color represented by the image signal is changed from "black" to "red", the color conversion circuit 54 first sets all luminance R, G, B, and W of the sub-pixels 34r, 34g, 34b, and 34w at "0". Then the color conversion circuit 54 increases luminance R of the sub-pixel 34r to the highest luminance "255" while maintaining luminance G, B, and W of the sub-pixels 34g, 34b, and 34w at "0", similarly to the first embodiment.

After that, the color conversion circuit 54 increases luminance W of the sub-pixel 34w to the highest luminance "255" and luminance G of the sub-pixel 34g to predetermined luminance, for example, "75" while maintaining luminance R of the sub-pixel 34r at "255" and luminance B of the sub-pixel 34b at "0". The increase rate of luminance G of the sub-pixel 34g is lower than the increase rate of luminance W of the sub-pixel 34w. By increasing luminance W of the sub-pixel 23w and slightly increasing luminance G of the sub-pixel 34g, the image brightness can be increased without substantially changing the hue. Moreover, the RGBW (total) chromaticity point (x, y) at which all luminance R, G, B, and W of the sub-pixels 34r, 34g, 34b, and 34w are "255" shifted to green and can be closer to the chromaticity point (x, y) at which luminance W of the sub-pixel 34w is "255".

After that, the color conversion circuit 54 increases luminance G of the sub-pixel 34g from "75" to the highest luminance "255" and luminance B of the sub-pixel 34b from "0" to the highest luminance "255" while maintaining luminance R and W of the sub-pixels 34r and 34w at "255". The increase rate of luminance G of the sub-pixel 34g is lower than the increase rate of luminance B of the sub-pixel 34b.

FIG. 10C shows a locus of a chromaticity point when the hue of the color represented by the image signal in CIE1931 chromaticity diagram (or an XY chromaticity diagram) is changed from "red" to "white". FIG. 10D shows the variation in brightness Y when the hue of the color displayed by the image signal is changed from "red" to "white". In FIG. 10D, a solid line indicates the variation in brightness Y in the first embodiment, and a broken line indicates the variation in brightness Y in the fourth embodiment.

Table 12 shows a relationship between the input (three primary color image signals) and the output (multi-primary color image signals) of the color conversion circuit 54 in the fourth embodiment.

TABLE 12

Black→Increment R→Red→Increment G and W→
Whitish Red→Increment G and B→White

| Hue | (r, g, b) | (R, G, B, W) |
|---|---|---|
| Black | (0, 0, 0) | (0, 0, 0, 0) |
| | ... | ... |
| | (128, 0, 0) | (128, 0, 0, 0) |
| | ... | ... |
| Red | (255, 0, 0) | (255, 0, 0, 0) |
| | ... | ... |
| | (255, 100, 100) | (255, 37, 0, 128) |
| | ... | ... |
| Whitish Red | (255, 200, 200) | (255, 75, 0, 255) |
| | ... | ... |
| | (255, 223, 223) | (255, 90, 128, 255) |
| | ... | ... |
| White | (255, 255, 255) | (255, 255, 255, 255) |

In the fourth embodiment, too, modified examples using "green" or "blue" instead of "red" and changing the hue from "black" to "white" through "green" or "blue" can also be achieved similarly to the first embodiment. For example, in a modified example wherein the hue is changed from "black" to "white" through "green" and "whitish green", luminance G is slightly increased together with luminance W (the increase rate of luminance G is lower than the increase rate of luminance W), similarly to the case of Table 12, when the hue is changed from "green" to "whitish green". The chromaticity point at which luminance W of the sub pixel 34w is "255" thereby shifted to the RGBW (total) chromaticity point. In addition, in a modified example wherein the hue is changed from "black" to "white" through "blue" and "whitish blue", luminance G is slightly increased together with luminance W (the increase rate of luminance G is lower than the increase rate of luminance W), similarly to the case of Table 12, when the hue is changed from "blue" to "whitish blue". The chromaticity point at which luminance of the white sub-pixel 34w is "255" thereby shifted to the RGBW (total) chromaticity point.

The above explanation is the example in which the chromaticity point at which luminance W of the white sub-pixel 34w is "255" is shifted to "blue" with respect to the RGBW (total) chromaticity point, but can also be applied to a case where the chromaticity point is shifted to the other color. For example, if the chromaticity point is shifted to "green", the chromaticity point at which luminance W of the white sub-pixel 34w is "255" shifted to the RGBW (total) chromaticity point by slightly increasing luminance B together with luminance W (the increase rate of luminance B is lower than the increase rate of luminance W).

[Fifth Embodiment]

In the fourth embodiment, the chromaticity point (x, y: 0.298, 0.305) at which luminance W of the white sub-pixel 34w is "255" shifted to blue with respect to the RGBW (total) chromaticity point (x, y: 0.314, 0.328) at which all luminance R, G, B, and W of the sub-pixels 34r, 34g, 34b, and 34w are "255" in the case of the first embodiment. A fifth embodiment in which the chromaticity point (x, y: 0.298, 0.305) at which luminance W of the white sub-pixel 34w is "255" shifted to blue with respect to the RGBW (total) chromaticity point (x, y: 0.314, 0.328) at which all luminance R, G, B, and W of the sub-pixels 34r, 34g, 34b, and 34w are "255" in the case of the second embodiment, will be explained.

FIGS. 11A-11D show operations of the color conversion circuit 54 when the hue of the color displayed by the image signal is changed from "black" to "yellow" and then changed to "white", similarly to the second embodiment. FIG. 11A shows a relationship between an image and luminance R, G, B, and W in the second embodiment, and FIG. 11B shows a relationship between an image and luminance R, G, B, and W output from the color conversion circuit 54 in the fifth embodiment.

In the fifth embodiment shown in FIG. 11B, when the hue of the color represented by the image signal is changed from "black" to "yellow", the color conversion circuit 54 first sets all luminance R, G, B, and W of the sub-pixels 34r, 34g, 34b, and 34w at "0". Then the color conversion circuit 54 increases luminance R of the sub-pixel 34r to the highest luminance "255" and luminance G of the sub-pixel 34g to the highest luminance "255" while maintaining luminance B and W of the sub-pixels 34b and 34w at "0".

After that, the color conversion circuit 54 increases luminance W of the sub-pixel 34w to the highest luminance "255" and decrease luminance R or G of the sub-pixel 34r or 34g (in FIG. 11, luminance R of the sub-pixel 34r) to predetermined luminance, for example, "241" while maintaining luminance G of the sub-pixel 34g at "255" and luminance B of the sub-pixel 34b at "0". The decrease rate (absolute value) of luminance R of the sub-pixel 34r is lower than the increase rate (absolute value) of luminance W of the sub-pixel 34w. By increasing luminance W of the sub-pixel 23w and slightly decreasing luminance R of the sub-pixel 34r (or luminance G of the sub-pixel 34g), the image brightness can be increased without substantially changing the hue. Moreover, the RGBW (total) chromaticity point (x, y) at which all luminance R, G, B, and W of the sub-pixels 34r, 34g, 34b, and 34w are "255" shifted to green and can be closer to the chromaticity point (x, y) at which luminance W of the sub-pixel 34w is "255".

After that, the color conversion circuit 54 increases luminance R of the sub-pixel 34r from "241" to the highest luminance "255" and luminance B of the sub-pixel 34b from "0" to the highest luminance while maintaining luminance G and W of the sub-pixels 34g and 34w at "255". The increase rate of luminance R of the sub-pixel 34r is lower than the increase rate of luminance B of the sub-pixel 34b.

FIG. 11C shows a locus of a chromaticity point when the hue of the color represented by the image signal in CIE1931 chromaticity diagram (or an XY chromaticity diagram) is changed from "yellow" to "white". FIG. 11D shows the variation in brightness Y when the hue of the color displayed by the image signal is changed from "yellow" to "white". In FIG. 11D, a solid line indicates the variation in brightness Y in the second embodiment, and a broken line indicates the variation in brightness Y in the fifth embodiment.

Table 13 shows a relationship between the input (three primary color image signals) and the output (multi-primary color image signals) of the color conversion circuit 54 in the fifth embodiment.

TABLE 13

| | Black→Increment R and G→Yellow→ Increment W, Decrement G→ Whitish Yellow→Increment B→White | |
|---|---|---|
| Hue | (r, g, b) | (R, G, B, W) |
| Black | (0, 0, 0) | (0, 0, 0, 0) |
| | . . . | . . . |
| | (128, 128, 0) | (128, 128, 0, 0) |
| | . . . | . . . |
| Yellow | (255, 255, 0) | (255, 255, 0, 0) |
| | . . . | . . . |
| | (255, 255, 100) | (248, 255, 0, 128) |
| | . . . | . . . |
| Whitish Yellow | (255, 255, 200) | (241, 255, 0, 255) |
| | . . . | . . . |
| | (255, 255, 223) | (248, 255, 128, 255) |
| | . . . | . . . |
| White | (255, 255, 255) | (255, 255, 255, 255) |

In the fifth embodiment, too, modified examples using "cyan" or "magenta" instead of "yellow" and changing the hue from "black" to "white" through "magenta" can also be achieved similarly to the second embodiment. For example, in a modified example wherein the hue is changed from "black" to "white" through "cyan" and "whitish cyan", luminance R or G is slightly decreased together with the increase of luminance W (the decrease rate of luminance R or G is lower than the increase rate of luminance W), similarly to the case of Table 13, when the hue is changed from "cyan" to "whitish cyan". In addition, in a modified example wherein the hue is changed from "black" to "white" through "magenta" and "whitish magenta", luminance R or G is slightly decreased together with the increase of luminance W (the decrease rate of luminance R or G is lower than the increase rate of luminance W), similarly to the case of Table 13, when the hue is changed from "magenta" to "whitish magenta". The chromaticity point at which luminance W of the sub-pixel 34w is "255" thereby shifted to the RGBW (total) chromaticity point.

The above explanation is the example in which the chromaticity point at which luminance W of the sub-pixel 34w is "255" is shifted to "blue" with respect to the RGBW (total) chromaticity point, but can also be applied to a case where the chromaticity point is shifted to the other color. For example, if the chromaticity point is shifted to "green", the chromaticity point at which luminance W of the sub-pixel 34w is "255" shifted to the RGBW (total) chromaticity point by slightly decreasing luminance B together with the increment of luminance W (the decrease rate of luminance B is lower than the increase rate of luminance W).

In the third embodiment, too, when the chromaticity point (x, y: 0.298, 0.305) at which luminance W of the sub-pixel 34w is "255" shifted to blue with respect to the RGBW (total) chromaticity point (x, y: 0.314, 0.328) at which all luminance R, G, B, and W of the sub-pixels 34r, 34g, 34b, and 34w are "255", luminance W of the sub-pixel 34w can be made closer to the RGBW (total) chromaticity point at which all luminance R, G, B, and W of the sub-pixels 34r, 34g, 34b, and 34w are "255", by increasing luminance W of the sub-pixel 34w to the highest luminance "255" and decreasing luminance R, G, and B of the sub-pixels 34r, 34g, and 34b to the predetermined luminance, similarly to the fourth and fifth embodiments.

Table 12 and Table 13 are explained as different tables but, since the input (three primary color image signals) of the color conversion circuit 54 in the left column in three tables (other than the hue "black" and "white") is included in a single table, two tables can be integrated into one table. In the fourth and fifth embodiments where the chromaticity point (x, y: 0.298, 0.305) at which luminance W of the sub-pixel 34w is "255" shifted to blue with respect to the RGBW (total) chromaticity point (x, y: 0.314, 0.328) at which all luminance R, G, B, and W of the sub-pixels 34r, 34g, 34b, and 34w are "255", a combination of luminance R, G, B, and W of the sub-pixels 34r, 34g, 34b, and 34w to achieve the hue of the color displayed by the image signal is set based on the integrated table.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

For example, according to the above embodiments, the unit pixel includes the sub-pixels having the color filters and executes color display for each unit pixel, but color display is not limited to this method. For example, a display device which executes color display in a field sequential system may be used. In the display device of the field sequential system, one frame includes a plurality of sub-frames corresponding to the primary colors to execute the color display. The same advantages can be obtained by setting luminance in the sub-frames corresponding to the respective primary colors to correspond to the above-explained combination of luminance of the sub-pixels. The display device of the field sequential system includes four light sources different in wavelength, and the light sources are sequentially turned on in one field. The light source may be a fluorescent tube or an LED.

The reflective liquid crystal display device has been explained as the multi-primary color display device in the above embodiments, but the embodiments are not limited to this. The embodiment can be applied to display devices capable of color display such as CRT, plasma display panels, SED display panels, and liquid crystal projectors.

Each element of the liquid crystal driving device 14 is implemented by hardware but can also be implemented by a computer program and, therefore, may be implemented by installing the computer program on a computer through a computer readable storage medium which stores the computer program and executing the computer program.

What is claimed is:

1. A display device comprising a unit pixel including a plural of sub-pixels,
   the plurality of sub-pixels including:
   a first sub-pixel displaying a first color having a first hue;
   a second sub-pixel displaying a second color having a second hue;
   a third sub-pixel displaying a first color having a third hue; and
   a fourth sub-pixel displaying a second color having a fourth hue,
   wherein the first hue, the second hue, and the third hue are selected from a group of red, green, and blue,
   the fourth hue corresponds to a point inside a triangle defined by a point corresponding to the first hue, a point corresponding to the second hue, and a point corresponding to the third hue, in CIE1931 chromaticity diagram, and
   luminance of the plurality of sub-pixels are set such that while a hue of a color displayed by the unit pixel is changed from black to white through a predetermined hue,
   luminance of the first sub-pixel is increased,
   luminance of the fourth sub-pixel is increased without increasing luminance of the third sub-pixel after the luminance of the first sub-pixel reaches predetermined luminance, and
   the luminance of the third sub-pixel is increased after the luminance of the fourth sub-pixel reaches the predetermined luminance.

2. The display device of claim 1, wherein
   the luminance of the plurality of sub-pixels are set such that while the hue of the color displayed by the unit pixel is changed from black to white through red,
   the luminance of the second sub-pixel and the luminance of the third sub-pixel are increased at a same rate after the luminance of the fourth sub-pixel reaches the predetermined luminance.

3. The display device of claim 1, wherein
   the luminance of the plurality of sub-pixels are set such that while the hue of the color displayed by the unit pixel is changed from black to white through yellow,
   the luminance of the first sub-pixel and the luminance of the second sub-pixel are increased at a same rate.

4. The display device of claim 1, wherein
   the luminance of the plurality of sub-pixels are set such that while the hue of the color displayed by the unit pixel is changed from black to white through orange,
   the luminance of the first sub-pixel is increased at a first rate and the luminance of the second sub-pixel is increased at a second rate lower than the first rate, and
   the luminance of the third sub-pixel is increased at a third rate and the luminance of the second sub-pixel is increased at a fourth rate lower than the second rate after the luminance of the fourth sub-pixel reaches the predetermined luminance.

5. The display device of claim 1, wherein
   the luminance of the plurality of sub-pixels are set such that while the hue of the color displayed by the unit pixel is changed from black to white through red,
   the luminance of the fourth sub-pixel is increased at a first rate and the luminance of the second sub-pixel is increased at a second rate lower than the first rate after the luminance of the first sub-pixel reaches the predetermined luminance, and
   the luminance of the third sub-pixel is increased at a third rate and the luminance of the second sub-pixel is increased at a fourth rate lower than the third rate after the luminance of the fourth sub-pixel reaches the predetermined luminance.

6. The display device of claim 1, wherein
   the luminance of the plurality of sub-pixels are set such that while the hue of the color displayed by the unit pixel is changed from black to white through yellow,
   the luminance of the first sub-pixel and the luminance of the second sub-pixel are increased at a same rate,
   after the luminance of the first sub-pixel reaches the predetermined luminance, the luminance of the fourth sub-pixel is increased at a first rate and the luminance of the first sub-pixel or the second sub-pixel is decreased after the luminance of the first sub-pixel reaches the predetermined luminance, and
   the luminance of the third sub-pixel is increased at a third rate and the luminance of the first sub-pixel or the second sub-pixel is increased at a fourth rate lower than the third rate after the luminance of the fourth sub-pixel reaches the predetermined luminance.

7. The display device of claim 1, wherein
   the first hue is red, the second hue is green, the third hue is blue, and the fourth hue is white.

8. A displaying method of a display device comprising a unit pixel including a plurality of stab pixels, the plurality of sub-pixels including:
   a first sub-pixel displaying a first color having a first hue;
   a second sub-pixel displaying a second color having a second hue;
   a third sub-pixel displaying a first color having a third hue; and
   a fourth sub-pixel displaying a second color having a fourth hue,
   wherein the first hue, the second hue, and the third hue are selected from a group of red, green, and blue,
   the fourth hue corresponds to a point inside a triangle defined by a point corresponding to the first hue, a point corresponding to the second hue, and a point corresponding to the third hue, in CIE1931 chromaticity diagram, the method comprising:
   setting luminance of the plurality of subpixels such that while a hue of a color displayed by the unit pixel is changed from black to white through a predetermined hue,
   luminance of the first sub-pixel is increased; and
   luminance of the fourth sub-pixel is increased without increasing luminance of the third sub-pixel after the luminance of the first sub-pixel reaches predetermined luminance, and
   the luminance of the third sub-pixel is increased after the luminance of the fourth sub-pixel reaches the predetermined luminance.

9. The displaying method of claim 8, wherein
   the luminance of the plurality of sub-pixels are set such that While the hue of the color displayed by the unit pixel is changed from black to white through red,
   the luminance of the second sub-pixel and the luminance of the third sub-pixel are increased at a same rate after the luminance of the fourth sub-pixel reaches the predetermined luminance.

10. The displaying method of claim 8, wherein
the luminance of the plurality of sub-pixels are set such that while the hue of the color displayed by the unit pixel is changed from black to white through yellow,
the luminance of the first sub-pixel and the luminance of the second sub-pixel are increased at a same rate.

11. The displaying method of claim 8, wherein
the luminance of the plurality of sub-pixels are set such that while the hue of the color displayed by the unit pixel is changed from black to white through orange,
the luminance of the first sub-pixel is increased at a first rate and the luminance of the second sub-pixel is increased at a second rate lower than the first rate, and
the luminance of the third sub-pixel is increased at a third rate and the luminance of the second sub-pixel is increased at a fourth rate lower than the second rate after the luminance of the fourth sub-pixel reaches the predetermined luminance.

12. The displaying method of claim 8, wherein
the luminance of the plurality of sub-pixels are set such that while the hue of the color displayed by the unit pixel is changed from black to white through red,
the luminance of the fourth sub-pixel is increased at a first rate and the luminance of the second sub-pixel is increased at a second rate lower than the first rate after the luminance of the first sub-pixel reaches the predetermined luminance, and
the luminance of the third sub-pixel is increased at a third rate and the luminance of the second sub-pixel is increased at a fourth rate lower than the third rate after the luminance of the fourth sub-pixel reaches the predetermined luminance.

13. The displaying method of claim 8, wherein
the luminance of the plurality of sub-pixels are set such that while the hue of the color displayed by the unit pixel is changed from black to white through yellow,
the luminance of the first sub-pixel and the luminance of the second sub-pixel are increased at a same rate,
after the luminance of the first sub-pixel reaches the predetermined luminance, the luminance of the fourth sub-pixel is increased at a first rate and the luminance of the first sub-pixel or the second sub-pixel is decreased after the luminance of the first sub-pixel reaches the predetermined luminance, and
the luminance of the third sub-pixel is increased at a third rate and the luminance of the first sub-pixel or the second sub-pixel is increased at a fourth rate lower than the third rate after the luminance of the fourth sub-pixel reaches the predetermined luminance.

14. The displaying method of claim 8, wherein
the first hue is red, the second hue is green, the third hue is blue, and the fourth hue is white.

* * * * *